US006503438B2

(12) United States Patent
Beaumont et al.

(10) Patent No.: US 6,503,438 B2
(45) Date of Patent: Jan. 7, 2003

(54) METHOD AND APPARATUS FOR BALANCING FLOWING CONDITIONS OF LAMINAR FLOWING MATERIALS

(75) Inventors: John P. Beaumont, Harborcreek; David A. Hoffman, Erie, both of PA (US)

(73) Assignee: Beaumont Runner Technologies, Inc., Erie, PA (US)

( * ) Notice: Subject to any disclaimer, the term of this patent is extended or adjusted under 35 U.S.C. 154(b) by 80 days.

(21) Appl. No.: 09/894,538

(22) Filed: Jun. 28, 2001

(65) Prior Publication Data

US 2002/0000685 A1 Jan. 3, 2002

Related U.S. Application Data

(60) Provisional application No. 60/214,354, filed on Jun. 28, 2000.

(51) Int. Cl.[7] ............................................... B29C 45/30
(52) U.S. Cl. ................................ 264/297.1; 264/297.2; 264/328.8; 264/328.12; 366/336; 366/441; 425/572; 425/588; 425/464
(58) Field of Search ........................... 264/176.1, 297.1, 264/297.2, 328.8, 328.12; 366/336, 337, 338, 339, 440, 441; 425/567, 572, 573, 588, 461, 464; 137/599.01

(56) References Cited

U.S. PATENT DOCUMENTS 2,191,703 A 2/1940 Anderson
2,476,884 A 7/1949 Maynard (List continued on next page.)

FOREIGN PATENT DOCUMENTS

JP 47-46458 11/1972

OTHER PUBLICATIONS

John P. Beaumont and Jack H. Young Mold Filling Imbalances in Geometrically Balanced Runner Systems, Journal of Injection Molding Technology, Sep. 1997, vol. 1, No. 3 11 pgs.

John P. Beaumont, Jack H. Young and Matthew J. Jaworski, Solving Mold Filling Imbalances in Multi–Cavity Injection Molds Journal of Injection Molding Technology, Jun. 1998, vol. 2, No. 2 12 pgs.

Primary Examiner—Jill L. Heitbrink
(74) Attorney, Agent, or Firm—Edward W. Goebel, Jr.; Jon L. Woodard; MacDonald, Illig, Jones and Britton LLP

(57) ABSTRACT

A tool structure or tool insert has a runner system which includes at least one branching runner which branches in at least two directions forming at least a first pair of branch runners for receiving laminar flowing material for the formation of a product. Each branch runner is at a position in the runner system such that it receives material having significantly similar conditions from side-to-side of a bisecting plane of that runner which bisects the cross section of at least a portion of the length of that branch runner. This material also has dissimilar conditions from side-to-side of a perpendicular plane of each branch runner which is perpendicular to the bisecting plane of that runner with the perpendicular plane of each branch runner also bisecting the cross section of the same portion of the length of each branch runner that the bisecting plane bisects. A repositioner in the tool or tool insert repositions the dissimilar conditions of the laminar flowing material to preselected positions in circumferential directions around the center of the flow paths of each runner of each pair of branch runners. Each pair of branch runners is joined at a location on each runner of each pair which causes the flow from each of these runners to form a half of a joint stream of material which has conditions across its flow path that are significantly balanced from side-to-side of two perpendicular planes which bisect the flow path of the joint stream.

48 Claims, 12 Drawing Sheets

U.S. PATENT DOCUMENTS

| | | | |
|---|---|---|---|
| 2,569,935 A | 10/1951 | Leguillon | |
| 3,389,749 A | 6/1968 | Towns et al. | 156/245 |
| 3,632,090 A | 1/1972 | White | |
| 3,664,638 A | 5/1972 | Grout | |
| 3,891,740 A | 6/1975 | Vannan | 264/263 |
| 3,940,224 A | 2/1976 | Armour | |
| 3,951,375 A * | 4/1976 | Lovell | |
| 3,963,221 A * | 6/1976 | Yi | |
| 3,968,307 A | 7/1976 | Matsui et al. | 428/373 |
| 4,034,965 A | 7/1977 | King | 259/4 |
| 4,123,496 A | 10/1978 | Gallizia et al. | 264/329 |
| 4,199,315 A * | 4/1980 | Gallizia et al. | |
| 4,299,553 A | 11/1981 | Swaroop | 425/572 |
| 4,451,224 A | 5/1984 | Harding | 425/548 |
| 4,541,982 A * | 9/1985 | Upmeier | |
| 4,620,958 A | 11/1986 | Wiechard | 264/297.2 |
| 4,752,199 A | 6/1988 | Arai | 425/130 |
| 4,848,920 A | 7/1989 | Heathe et al. | 366/339 |
| 4,905,901 A | 3/1990 | Johnson | 239/135 |
| 5,069,840 A | 12/1991 | Arnott | 264/69 |
| 5,227,181 A | 7/1993 | Knudsen | 425/549 |
| 5,262,119 A | 11/1993 | Smith | 264/513 |
| 5,683,731 A * | 11/1997 | Deardruff et al. | |
| 5,707,664 A | 1/1998 | Mak | 425/549 |
| 5,955,121 A | 9/1999 | Gellert et al. | 425/549 |
| 6,077,470 A * | 6/2000 | Beaumont | |
| 6,162,044 A | 12/2000 | Babin | 425/562 |
| 6,203,310 B1 | 3/2001 | Matysek | 425/547 |

* cited by examiner

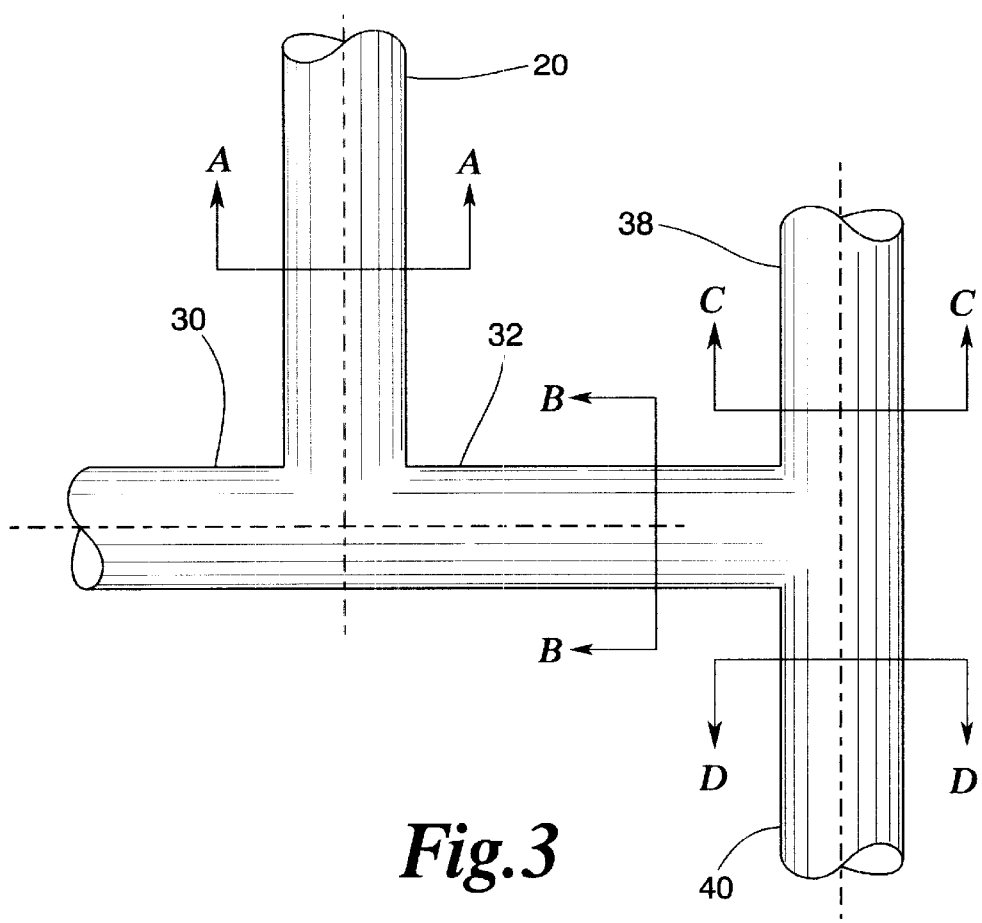
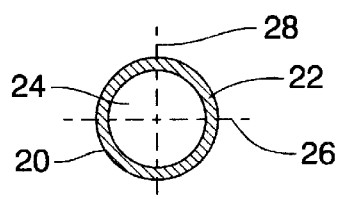
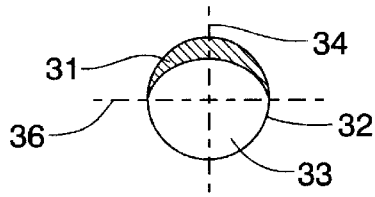
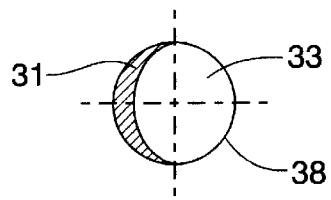
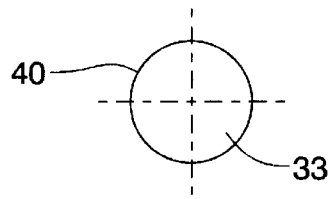
*Fig.3*
*Fig.3A*  *Fig.3B*  *Fig.3C*  *Fig.3D*

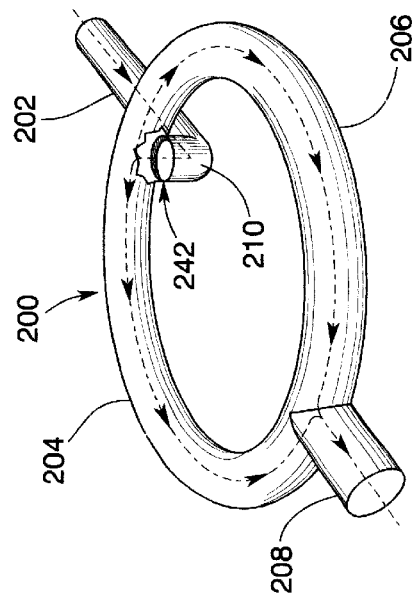
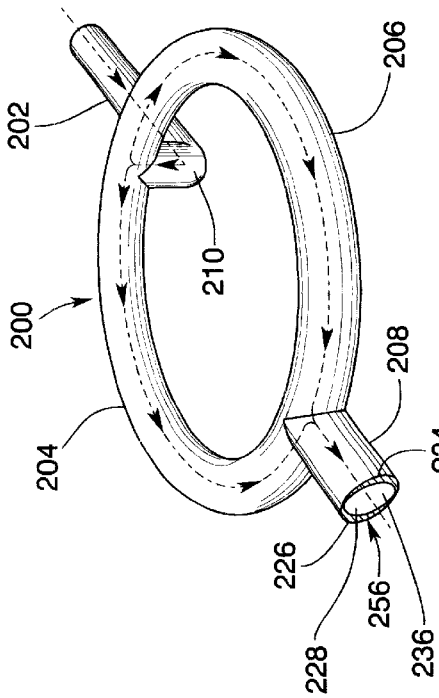
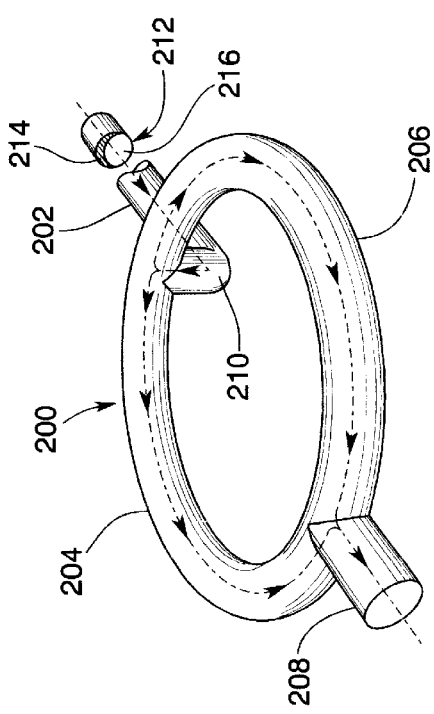
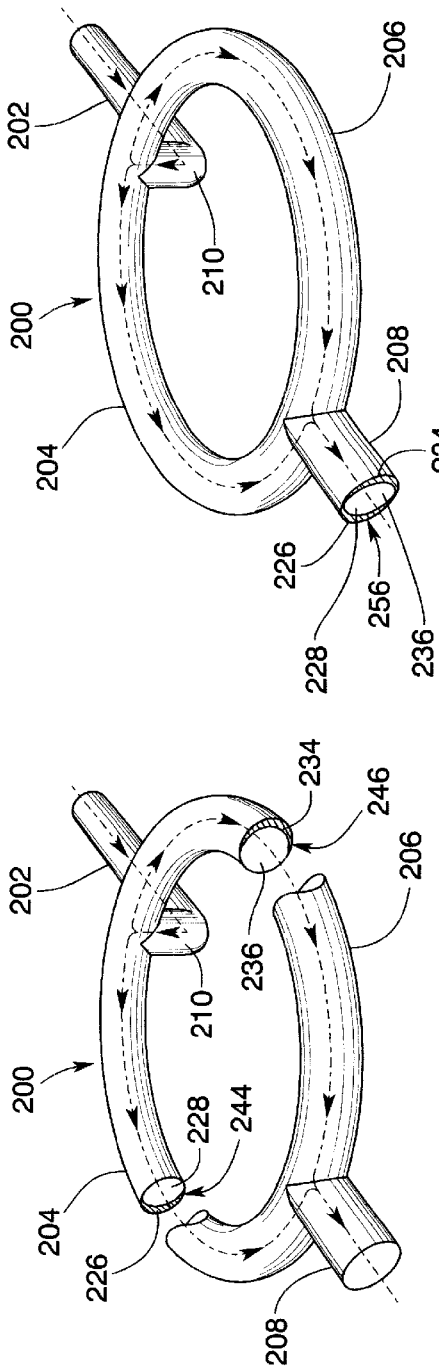
Fig.9A
Fig.9B
Fig.9C
Fig.9D

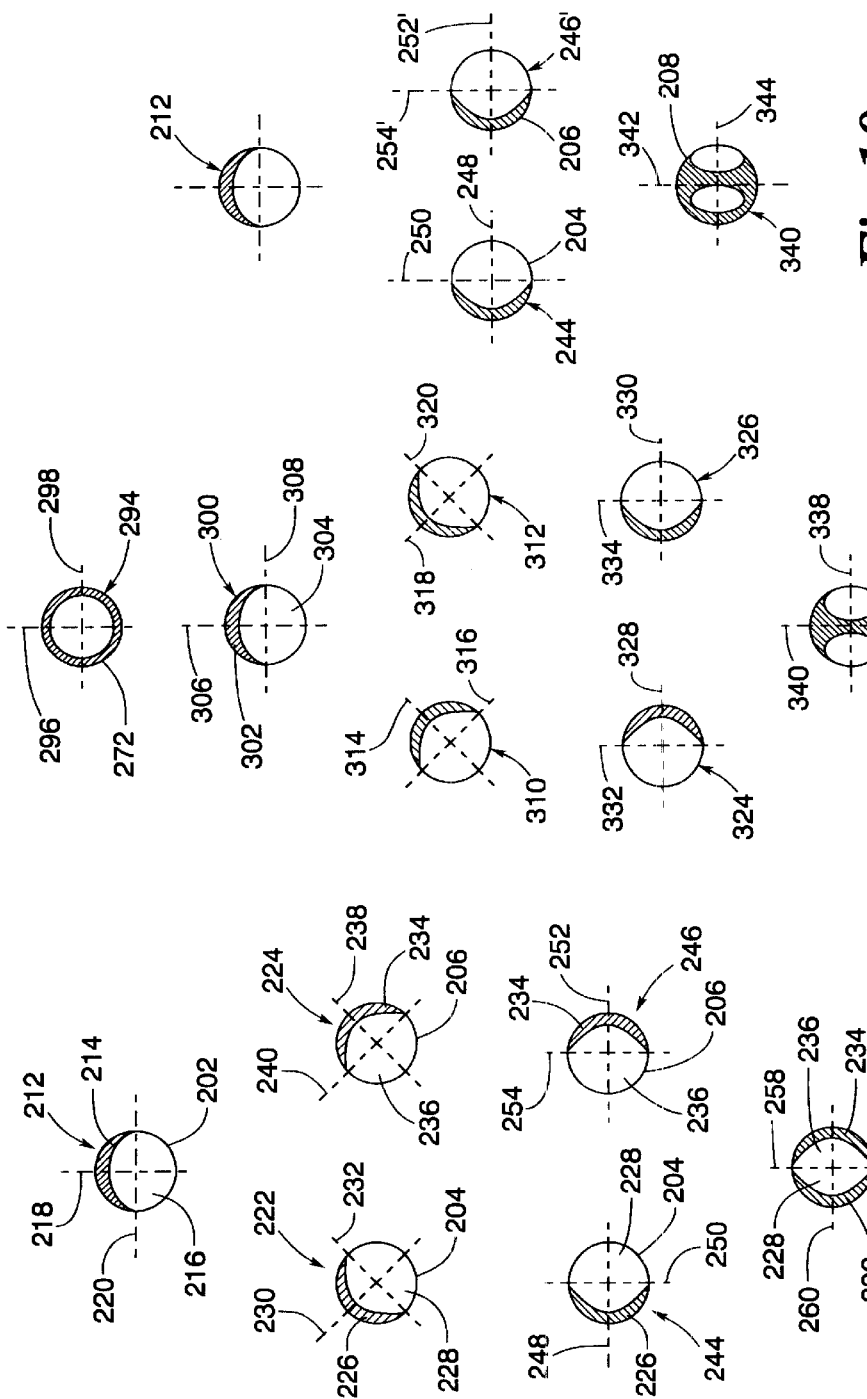

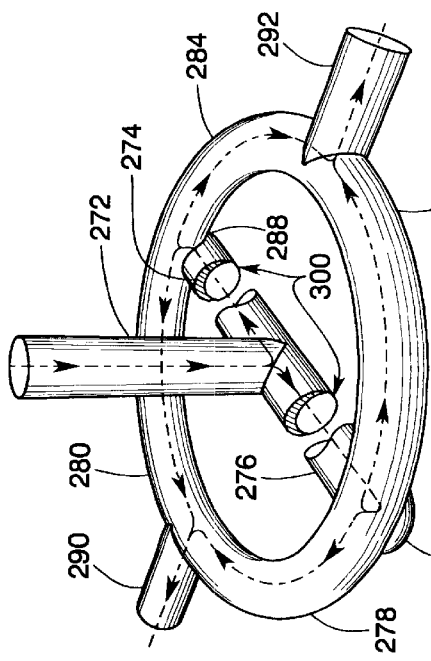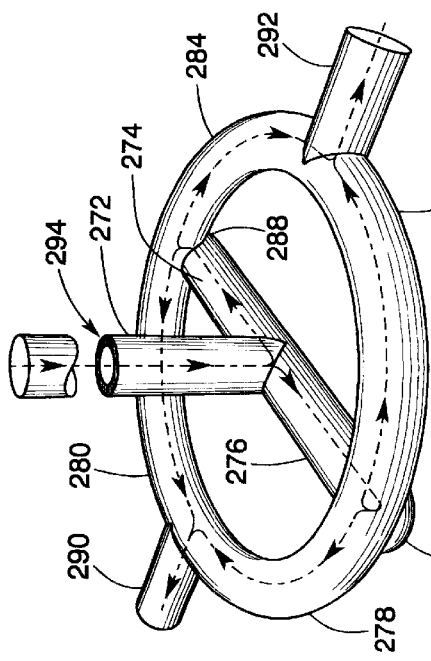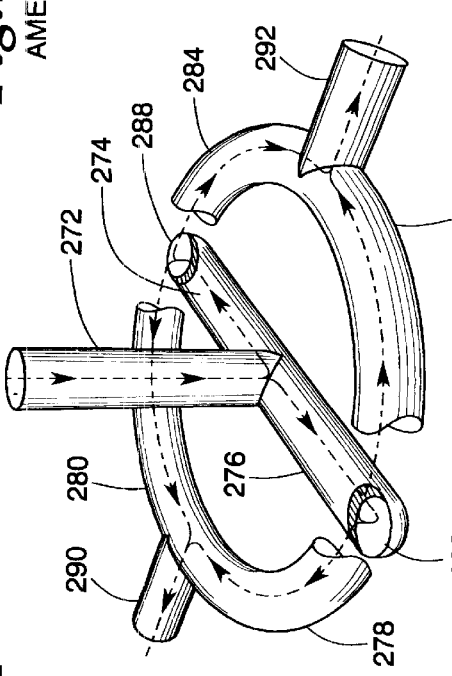

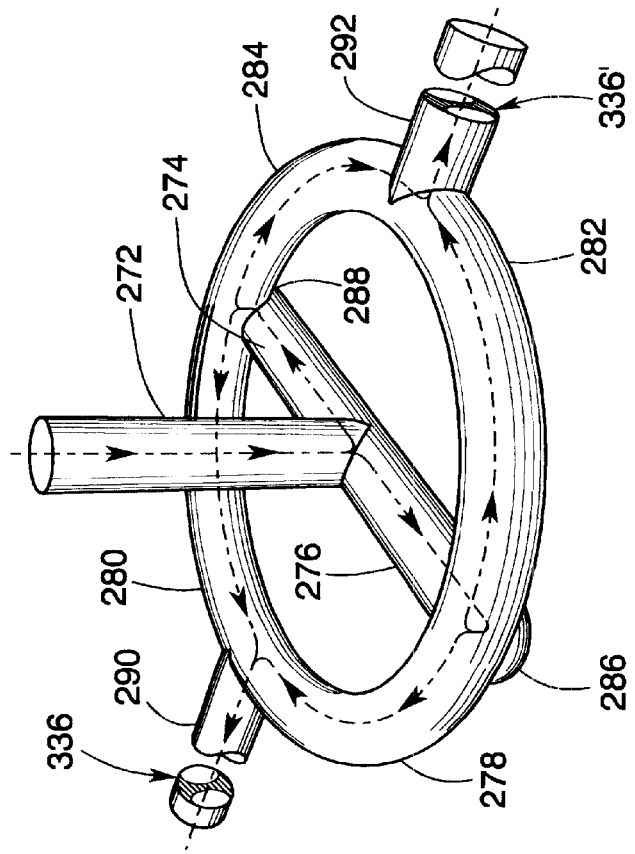
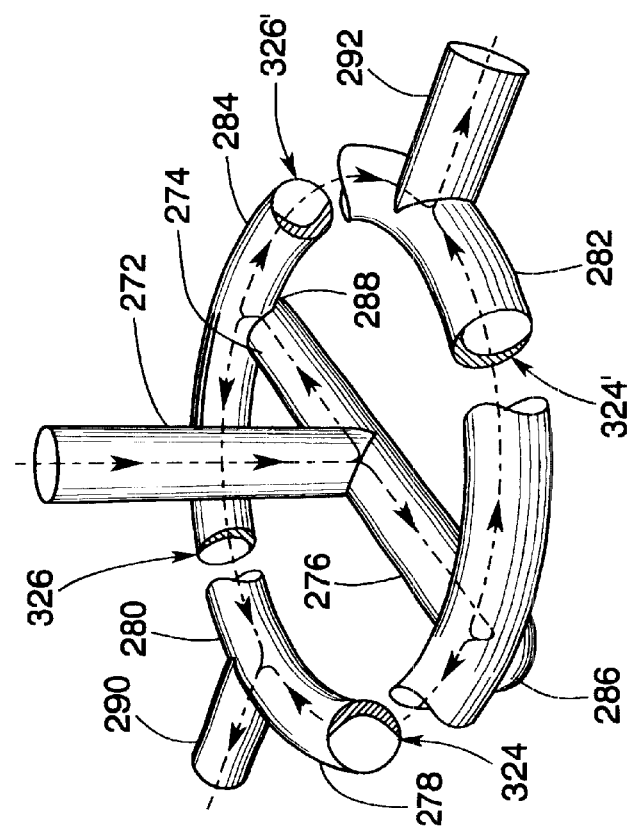
Fig.11E AMENDED
Fig.11D AMENDED

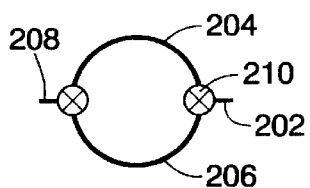
*Fig.12A*
AMENDED
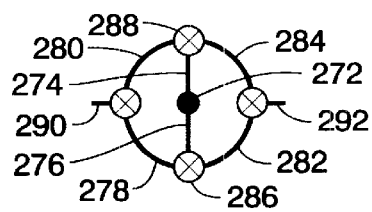
*Fig.12B*
AMENDED
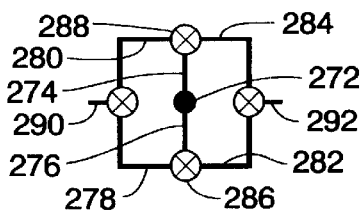
*Fig.12C*
AMENDED

METHOD AND APPARATUS FOR BALANCING FLOWING CONDITIONS OF LAMINAR FLOWING MATERIALS

This application bases its priority on Provisional Application No. 60/214,354 filed on Jun. 28, 2000, which is incorporated herein by reference in its entirety.

BACKGROUND

This invention relates to a method and apparatus for affecting the formation of a product made from laminar flowing material flowing in a molding tool by producing significantly balanced conditions of concentric laminates of that material.

Various manufacturing processes and apparatus use laminar flowing material flowing through one or more tools, such as dies or molds, in the formation of products. These tools have various part forming geometries used to shape the laminar flowing materials into desired products. As used hereinafter, the term "tool" includes all of the components within the body of an entire mold or die used to produce one or more products. Normally, tools of these types are constructed of high strength materials, such as tool steels or aluminum alloys having a very high compression yield strength, so as to withstand the pressure which forces the laminar flowing material through flow paths within the tools. These flow paths are commonly referred to by terms such as channels or runners, depending on the actual manufacturing process or tool being used. The terms "runner" and "runner system" will be used hereinafter to mean a flow path through a tool for laminar flowing material.

Runners used to deliver laminar flowing material may be machined or formed directly into the surface of one or more matched plates in one or more halves of a tool such that when combined form a runner or runners. Runners may also be machined into a block or blocks of steel or other high strength materials. Blocks of high strength materials are typically used as hot manifold systems, which are parts of tools used in injection molding processes. Runners may also be machined into one or more inserts, which can be added to a portion of the plate(s) or the block(s) of a tool. These inserts are also sometimes referred to as runner bars or runner inserts. Inserts may contain only a portion of the runner system or the entire runner system. Some tools also use items normally referred to as plugs which are typically inserted into runners in blocks of steel or other high strength materials to terminate a portion of a machined runner or otherwise affect the flow of material in the tools. These plugs will also be included hereinafter in the term "insert." Inserts may include runners used for new tools or may be used to retrofit existing tools to alleviate problems in the manufacture of products.

Typical cross sectional shapes of runners include, but are not limited to, full round, half round, trapezoidal, modified trapezoidal or parabolic, and rectangular. Runners maybe solidifying or non-solidifying. For example, in thermoplastic injection molding processes, laminar flowing material in cold runners solidifies during the manufacture of products and is ejected from the tool during each cycle of the process. Whereas, hot runners are typically machined inside a block of high strength material and heated within the block so that the laminar flowing material within the hot runners remains fluid and is not ejected. Some tools may contain both hot runners and cold runners.

Manufacturing processes using tools and runner systems of the types described above include, but are not limited to, injection molding, transfer molding, blow molding and extrusion molding. The materials typically used in these processes include thermoplastics, thermosets, powdered metal and ceramics employing laminar flowing carriers, such as polymers. While this invention is useful for manufacturing methods and for apparatus which use the materials described above, this invention can be used to correct imbalances occurring in any tool in which imbalances occur in runners carrying a fluid exhibiting laminar flow and having a viscosity which is affected by shear rate (as with a non-Newtonian fluid) and/or by temperature, that is a fluid exhibiting variations in its characteristics as a result of variations in shear or flow velocity across the cross section of a runner.

Molding processes produce products by flowing laminar flowing material from a material source and through a runner system in a tool to an area or areas where the material is used to form the product. Molding processes include injection and transfer molding, in which laminar flowing material is injected under high pressure into a tool and through the runner system to a cavity or cavities in the tool (called a mold). The mold may have a single parting plane which separates two mold halves for forming molded items, or the mold may be a stack mold which has more than one parting plane, each separating a pair of mold halves. The material flows in concentric laminates through runners of whichever shape is used for a tool by following the center of the path of the runners.

Another manufacturing process using laminar flowing materials flowing in a runner system through a tool is extrusion blow molding. In the extrusion blow molding process, laminar flowing material is fed from a material source through a tool which includes a single runner or a branched runner system. After the material is fed through the runner system, it passes around a normally torpedo shaped insert near the end of the runner system which is used to form the solid stream of laminar flowing material into a tube, or profile, of material exiting the die. This tube of material is normally referred to as a parison. As the parison continues to lengthen to its desired length, it is clamped between two halves of a tool closing around it, and the tool then normally pinches off the bottom of the parison. Next, air is injected inside the tube of material, causing the material to expand against part forming walls of the tool. The material inside the tool is then cooled, solidifies, and is ejected after the tool is opened at the end of each production cycle. The tool then returns into position to grab another parison.

Yet another process using laminar flowing material flowing in a runner system through a tool is extrusion. In extrusion processes the laminar flowing material is normally, continuously fed from a material source through a die having a single runner or a branched runner system to be delivered to a part forming geometry which shapes the material as it exits at the end of the die. The extrusion process is normally referred to as a steady-state process and produces continuous shapes, or profiles, such as pipes or the coatings on electrical wires. As the laminar flowing material exits the part forming die, the material is normally drawn through a coolant, such as water, where it takes on its final shape as it solidifies.

Regardless of process and the type of tool used, as a laminar flowing material flows through a runner, the material near the perimeter of the runner experiences high shear conditions, whereas the material near the center experiences low shear conditions. These shear conditions are developed from the relative velocity of the flowing material to the stationary boundary of the flow channel and the relative velocity of the laminates of material flowing through the channel. The relative velocity of these laminates is usually referred to as the shear rate of the material. FIG. 1 illustrates a characteristic shear rate distribution across the diameter "d" of a runner, where the magnitude of the shear rate is shown on the horizontal axis and the diameter is shown on the vertical axis. As seen in FIG. 1, shear rate is normally at or near zero at the outermost perimeter of a runner, is at its maximum level near the perimeter of the runner, and is then reduced to a level at or near zero in the center of the runner.

The result is that the laminar flowing material near the perimeter of the runner is dominated by high sheared material, and the center of the runner is dominated by low sheared material. The high sheared material will gain heat from friction caused by the relative velocity of the laminates as the laminar flowing material flows through the runner. This heat, and the effects of the shear on the non-Newtonian characteristics of polymers and other laminar flowing materials, will normally cause the high sheared material near the perimeter of the runner to have a lower viscosity and, thus, flow more easily than the material in the center of the runner. It is possible that the material near the perimeter could have a higher viscosity in some cases such as at a very low flow rate where a cold mold may have a dominant effect on increasing the viscosity of a thermoplastic material than the shear has on reducing the viscosity near the perimeter. In addition, there may be other phenomena occurring during the material flow that are not clearly understood. These phenomena combine with the known conditions of the high sheared material to cause material near the perimeter of a runner to have different conditions from those of the material in the center region of a runner, and experience problems of imbalances similar to those discussed below.

For discussion purposes, assume that the high sheared flowing material will have a lower viscosity, and the lower viscosity material near the perimeter of a runner will flow more easily than the higher viscosity material near the center of the runner. Referring to FIG. 2, across a circular cross section of a runner 20 is a simplified representative shape which depicts the relative position of a high sheared region 22 and a low sheared region 24 which, for illustrative purposes, does not show areas of graduation between these regions. The zero and low sheared conditions in a thin outermost region of the runner 20 are ignored, since there is zero to low flow within this region and therefore is less able to transfer its conditions to downstream locations in the runner relative to the dominant higher flow high shear region.

The effects on the flow of laminar flowing material and products produced by this material, as related to this invention, are dominated by the contrasts of the characteristics between the high sheared region of runner 20 near its outermost perimeter, as shown in FIG. 2 and the low sheared region of the runner 24 in the center region of the flow channel. The high and low sheared regions of material are significantly balanced about any plane which bisects the centerline of the length of runner 20, such as planes 26 and 28. As shown in FIG. 2, the high and low sheared conditions of the material are symmetrical about planes 26 and 28. The conditions of laminar flowing material, such as the existence of high and low sheared material, are referred to herein as being "significantly balanced" about or from side-to-side or across a plane at a particular location in a runner where the amounts of material having such conditions on both sides of the plane are close enough to being equal so that the differences do not significantly adversely affect a product being produced by a tool, such as a mold or a die, containing the runner. Conditions of a material which include dissimilar properties are "significantly balanced about a plane" or "significantly balanced from side-to-side across a plane" may be symmetrically distributed about the plane, may have a shape which depicts the relative position of the high and low sheared regions on one side of a plane which is substantially similar to the shape they have on the other side of the plane, or may have a representative shape which depicts the relative position of the high and low sheared regions on one side of a plane which is different from that on the other side, but the amounts of high sheared material and low sheared material on both sides of the plane are close enough to being equal that the differences do not adversely affect the formation of the product being produced. However, the shapes these conditions take on either side of the plane may not be critical for some applications, as long as the conditions on either side of the plane do not cause unwanted effects on the product being produced.

Non-balanced conditions are developed in a runner system when a first runner section, such as runner 20 shown in FIG. 2, branches in two or more directions as shown in FIG. 3. Runner 20 may be a sprue, a specially designed runner which conveys material from a material source, such as an injection molding machine, or it may be a runner at a selected location in a tool. Cross section AA in FIG. 3A shows the symmetrical conditions about the planes 26 and 28, which are depicted in FIG. 2. As runner 20 branches in two directions, each of the branches 30 and 32 receives equal portions of high and low sheared material. The high and low sheared material on the left side of runner 20 flows to the left branching runner 30, and the high and low sheared material on the right side of runner 20 flows to the right branching runner 32. The two halves of material from runner 20 will reform to an approximate shape of the branch runners 30 and 32. In this case, assuming the material is flowing from top to bottom of runner 20, the high and low sheared material from runner 20 will distribute itself in runners 30 and 32 in the approximate positions and shapes illustrated in section BB of runner 32, which are shown in FIG. 3B. As can be seen in FIG. 3B, due to the laminar flowing conditions of the material, the flow of material in runner 20 causes most of the high sheared material near the periphery of runner 20 to remain as high sheared material 31 on the top side of both of the branching runners 30 and 32. The low sheared material at the center of runner 20 flows to the bottom of the branch runners 30 and 32 as they are shown in FIG. 3 and is shown as low sheared material 33. Referring to FIG. 4, which is a perspective view of conditions of material in runner 32 taken at section BB, the distribution of the high sheared material 31 and the low sheared material 33 in runner 32 is symmetrical and, thus, significantly balanced, from side-to-side across plane 34, which bisects the length of runner 32, as well as bisects runner 20. Additionally, the distribution of high sheared material 31 and the low sheared material 33 is unbalanced from side-to-side across plane 36, which bisects runner 32 and is perpendicular to plane 34.

Referring once again to FIG. 3, the branch runner 32 itself branches in two directions through runner 38 which extends toward the top of FIG. 3 and runner 40 which extends toward the bottom of FIG. 3. Due to the laminar nature of the material, most or all of the high sheared material 31 at the top of runner 32, see FIG. 3B, flows into runner 38 and primarily or solely low sheared material 33 flows into runner 40. See FIG. 3C which shows the high sheared material 31 at Section CC of runner 38 and FIG. 3D which shows the low sheared material 33 at Section DD of runner 40. The actual distribution of the high sheared material 31 across the cross section of runner 32 in any tool will determine how much, if any, of the high sheared material flows in runner 40 and, thus, whether most or all of the high sheared material 31 flows in runner 38. These unbalanced material conditions between two branching runners which had branched in two directions following a previous two direction runner branch have been explained in U.S. Pat. No. 6,077,470 filed in the name of John P. Beaumont on Oct. 14, 1998 and issued on Jun. 20, 2000 (the "Beaumont Patent"). The Beaumont Patent is incorporated herein by reference in its entirety. The Beaumont Patent also discloses the many problems that material conditions which are unbalanced between and/or within runners can cause with respect to the formation of products.

The Beaumont Patent also discloses a solution to many of the product formation problems caused by the unbalanced material conditions between runners. FIG. 5 is identical to FIG. 3, except that at the location when branching runner 20 branches into branch runners 30 and 32 there is a repositioner 42 made and operating according to the Beaumont Patent. Thus, referring to FIG. 3 along with FIG. 5, the repositioner 42 affects the high sheared conditions 31 shown in FIG. 3B that are non-symmetrical from side-to-side about the plane 36. According to the Beaumont Patent, the repositioner 42 repositions the non-symmetrical high sheared conditions 31 of the laminar flowing material to a desired position in a circumferential direction around the center of the path of the runners 32, while maintaining continuity between laminates from about the centers through the perimeters of each of the runners. The repositioner 42 does the same for the runner 30. Comparing FIG. 3B with FIG. 5B, the repositioner 42 has repositioned the high sheared conditions 31 of the laminar flowing material about 90° from being centered at the top of runner 32, as shown in FIG. 3B, to being centered on the right side of runner 32 as shown in FIG. 5B. As a result, at the branch of the runner 32 in FIG. 5, where it branches into runners 38 and 40, the conditions of the laminar flowing material are now significantly balanced about a plane 36 which bisects the cross section of the runner at that location.

The effects of this balance can be seen by comparing the amounts of high sheared material and low sheared material at Section CC of runner 38 in FIG. 5C and Section DD of runner 40 in FIG. 5D. Referring to FIGS. 5C and 5D, along with FIG. 5B, since the high sheared material 31 in runner 32 was repositioned from the top to the side of runner 32, one portion 31C of the high sheared material 31 and one portion 33C of low sheared material 33 flows into runner 38. Another portion 31D of the high sheared material 31 and another portion 33D of the low sheared material 33 flows into runner 40.

Additionally, the high sheared material 31C and low sheared material 33C as shown in FIG. 5C are significantly similar from side-to-side of a plane 44 which bisects the runner 38 and are dissimilar from side-to-side of a plane 46 which is perpendicular to plane 44 and also bisects the runner 38. Similarly, the high sheared material 31D and the low sheared material 33D, as shown in FIG. 5D, are significantly similar from side-to-side of a plane 48 which bisects runner 40 and are dissimilar from side-to-side of a plane 50 which is perpendicular to plane 48 and also bisects runner 40. Should either or both of the runners 38 and 40 branch in two directions along a plane parallel to a plane which includes the centerlines of these runners and the runner 32, the fact that the high sheared and low sheared conditions of the laminar flowing material in each runner 38 and 40 are significantly similar about a plane, planes 44 and 48, respectively, allows a repositioner of the type disclosed in the Beaumont Patent to be utilized at the location of the branch of runner 32 to reposition the high sheared conditions in each of the runners 38 and 40 about these centers of the runners so that runners branching in two directions along the plane off either of these runners 38 and 40 receive significantly balanced amounts of high sheared material and low sheared material. The same may be applied to runner 30 and its additional balancing runners.

However, problems still exist for the manufacture of some products and with some types of manufacturing processes that the application of the melt repositioner as disclosed in the Beaumont Patent in and of itself does not completely solve. By way of example, FIG. 6 shows runners feeding laminar flowing material to a cross section of a portion of a mold having a pair of cavities, each forming a product about a core. Thus, a branching runner 52 branches in two directions into runners 54 and 56, each of which branches in one direction into runners 58 and 60, respectively. Runner 58 feeds material into cavity 62 which forms a product around a core 64, while runner 60 feeds material into a cavity 66 which forms a product around a core 68.

The material flowing through runner 52 has high sheared material 70 and low sheared material 72 balanced about two perpendicular planes which bisect the cross section of the runner 52, as shown at Section AA in FIG. 6A. The high sheared material flowing from runner 52 and through the runner 56 forms at the top side of this runner, as viewed from Section BB, and then forms on the left side of runner 60 as it branches in one direction from the runner 56. FIG. 6B shows the approximate positions of the high sheared material 74 and low sheared material 76 at Section BB of runner 56, while FIG. 6C shows at Section CC that due to the laminar nature of the flowing material, the position of the high sheared material 74 is on the left side of runner 60.

As a result, the left side 78 of cavity 66 is filled around the core 68 with predominantly high sheared material, while the right side 80 of the cavity 66 is filled around the core 68 with predominantly low sheared material. For this reason the left side 78 of the cavity 66 fills more rapidly with the high sheared material than does the right side 80, a higher pressure is built up on the left side 78 of the core 68 than there is on its right side 80, and the core 68 tends to shift to the right. As a result, a product 82 manufactured in the cavity may not be uniform in cross sections and it tends to have a wall 84 on its left side which is thicker than a wall 86 on its right side. While this phenomenon is somewhat simplified for the sake of clarity, cores must be installed in many product forming cavities in a manner which withstands the core shifting pressures resulting from this phenomenon. Even where the cores are prevented from shifting, difference in the filling rates due to the high sheared material flowing around one side of the cavity and the low sheared material flowing on the other can cause differences in the two sides of the product.

An example of a similar problem exists in certain extrusion blow molding manufacturing processes as shown in FIG. 7. A die 88 has a branching runner system extending through it which includes a primary runner 90 which branches into secondary runners 92 and 94. The secondary runner 92 branches into tertiary runners 96 and 98 which feed laminar flowing material over torpedo shaped inserts 100 and 102 to form parisons 104 and 106, respectively. Similarly, the secondary runner 94 branches into tertiary runners 108 and 110 which feed laminar flowing material over inserts 112 and 114 to form parisons 116 and 118, respectively.

In the course of the extrusion blow molding process, laminar flowing material is fed from a material source and through the runner system just described to form the parisons 104, 106, 116 and 118. These parisons are produced to a desired length and are then clamped between two halves of a tool which close around them, normally pinching off the bottoms of the parisons. Next air is injected into the parisons to cause them to expand against the part forming walls of the tool to make a desired product.

The high sheared material, represented by the darker cross sections, flows through the runner system of the die 88 in the same manner that the high sheared material was described as flowing with respect to the runner system shown in FIG. 6. Thus, the high sheared, low viscosity laminates are around the total perimeter of the runner 90. As the runner 90 splits or branches in two directions, the high sheared material travels along the top of the runners 92 and 96 to form a left side 120 of parison 104. In a similar manner the high sheared material flows along the top of runners 94 and 110 and forms a right side 122 of parison 118. The low sheared material, on the other hand, flows through the center of the runner 90 and through the bottom of the runners 92 and 96 on the left side of the die 88 and through all of runner 98 on the left side of die 88 and through the bottom of runners 94 and 110 and through all of runner 108 on the right side of die 88.

As a result of this flow of high sheared material through the runners of the die 88, the more rapidly flowing high sheared material forms the outer area of the left side 120 of the parison 104 and the outer area of the right side of the parison 118. Lower sheared material forms the balance of the parisons 104 and 118 and forms primarily all parts of the parisons 106 and 116. As a result, the outside parisons 104 and 118 form more rapidly than the inside parisons 106 and 116. Since all of the parisons must have at least a minimum length before the part forming tool is placed around all of them, the faster forming parisons 104 and 118 will be longer than the slower forming parisons 106 and 116 and will thus have more material cut off than will the parisons 106 and 116, forming more scrap. Additionally, the parisons 104 and 118 will have side-to-side variations due to having the high sheared material formed on one side of each of them. This tends to cause problems such as more weight on the side of the parison with the high sheared material so that side is drawn down more by its weight and other side-to-side variations in the parisons 104 and 118 which cause them to be less predictable when air is blown into them to form products, and the side-to-side variations of the parisons 104 and 118 tend to cause them to bend toward the middle of the die, out of line with each other and with the parisons 106 and 116, making it more difficult for the product-forming tool to capture all of these parisons in the desired position in the corresponding tool cavities.

A stack mold is used in some injection molding processes to increase the number of cavities for manufacturing a product and to reduce the required clamp tonnage, and thus the size, of the injection molding machine which supplies laminar flowing material to the mold. A stack mold is a tool which contains more than one pair of product-forming sections stacked behind one another with each section separated by a parting line. By way of example, a stack mold having two pairs of part-forming sections and thus two parting lines has a manifold which houses a hot runner system that receives laminar flowing material from a sprue or nozzle of the injection molding machine and delivers the material to each of the two parting planes where the material fills cavities formed by the two part-forming sections of the stack mold which are separated by each of the parting planes.

FIG. 8 is a perspective view of a simplified hot runner system for use with a stack mold having two parting planes. FIG. 8 also includes a representation of the distribution of high sheared material along the runners of this runner system. Typically, an extended sprue or nozzle, not shown, delivers laminar flowing material from an injection molding machine nozzle and through to a manifold. As shown in FIG. 8, the laminar flowing material would be delivered to a runner 124 which branches to the left into runner 126 and into the right into runner 128. The runner 126 branches into two directions, upwardly into runner 130 and downwardly into runner 132. Runner 130 branches into runner 134 which extends to a first parting plane represented by an end 136 of the runner 134 as shown, and the runner 130 also branches into a runner 138 which extends to a second parting plane of the stack mold represented by an end 140 of the runner 138, as shown. The runners 134 and 138 are normally parallel with the runner 124. Similarly, the runner 132 branches into runners 142 and 144 which, as shown, extend to end 146 at the first parting plane and end 148 at the second parting plane, respectively. Similarly, the runner 128 branches upwardly into runner 150 and downwardly into runner 152. The runner 150 branches into runners 153 shown with an end 154 at the first parting plane and a runner 156 shown with an end 158 at the second parting plane. The downwardly extending runner 152 branches into runner 160 which extends to the first parting plane represented by an end 162 and branches into runner 164 which extends to the second parting plane represented by an end 166. The runners 134, 138, 142, 144, 153, 156, 160 and 164 all extend in a direction which is normally parallel to runner 124.

The arrows in FIG. 8 show the direction of the flow of laminar flowing material throughout the runner system shown in FIG. 8. The laminar flowing material will flow from the injection molding machine and into the extended sprue or nozzle often referred to as a sprue bar, which conveys it through the part-forming sections separated by the first parting plane not shown and then into the runner 124 at the end of the sprue bar. The oval at about the middle of each of the runners in FIG. 8 has a dark area at the approximate position where the high sheared material is located near the outermost perimeter of each runner. The high sheared material is shown near the total perimeter of the runner 124. The high sheared outer laminates are distributed along the inside of the turn of the material to the left into runner 126 and the inside of the turn of the material to the right into runner 128 as shown by the ovals 168 and 170, respectively. As a result, where the runner 126 branches into runners 130 and 132, the high sheared material follows the inside of each turn and is near the perimeter of approximately the right side of the runners 130 and 132 as shown by the ovals 172 and 174. As a result, when the runners 130 and 132 branch to the left and to the right, the high sheared material flows into runners 134 and 142, respectively, to be delivered to the product-forming cavities at the first parting plane of the mold. Low sheared material, represented by ovals 176 and 178, is delivered through the runners 138 and 144 to the second parting plane. For the same reasons, the high sheared material shown near the perimeter of one side of runner 128 is delivered through the runners 150 and 152 and the runners 153 and 160 to the first parting plane. Substantially no high sheared material is delivered through the runners 156 and 164 to the second parting plane. As a result, differences can be expected between products formed by part-forming sections separated by the first parting plane versus products formed by part-forming sections separated by the second parting plane.

The problems discussed above with respect to FIGS. 6, 7 and 8 are merely a few examples of the numerous applications which are possible for this invention. Many other uses for this invention will be obvious to those skilled in the art.

SUMMARY

This invention may be used in a new method, a new tool structure or a new insert for tools to provided for controlling the formation of products made by flowing laminar flowing material through a runner system in a tool which includes at least one branching runner which branches in at least two directions.

According to this invention, a tool structure or tool insert has a runner system which includes at least one branching runner which branches in at least two directions forming at least a first pair of branch runners for receiving laminar flowing material for the formation of a product. Each branch runner is at a position in the runner system such that it receives material having significantly similar conditions from side-to-side of a bisecting plane of that runner which bisects the cross section of at least a portion of the length of that branch runner. This material also has dissimilar conditions from side-to-side of a perpendicular plane of each branch runner which is perpendicular to the bisecting plane of that runner with the perpendicular plane of each branch runner also bisecting the cross section of the same portion of the length of each branch runner that the bisecting plane bisects.

A repositioner in the tool or tool insert repositions the dissimilar conditions of the laminar flowing material to preselected positions in circumferential directions around the center of the flow paths of each runner of each pair of branch runners, while maintaining continuity between laminates of the material from the center through the perimeter of each branch runner. Each pair of branch runners is joined at a location on each runner of each pair which causes the flow from each of these runners to form a half of a joint stream of material which, due to the preselected positions to which the dissimilar conditions of the laminar flowing material have been repositioned around the centers of the flow paths of each runner and of each pair of branch runners, has conditions across its flow path which are significantly balanced, but not necessarily symmetrical, from side-to-side of two perpendicular planes which bisect the cross section of at least a portion of the flow path of the material immediately downstream of where the joint stream of material is formed.

This invention does not reside in any one of the features of the method, tool structure or insert for tools disclosed above or which are more fully described in the Description of the Preferred Embodiment and claimed below. Rather, this invention is distinguished from the prior art by the combination of features which make up a unique method, tool structure and insert. Important features of this invention are shown and described below to illustrate the best mode contemplated to date of carrying out this invention.

However, those skilled in the art understand that this invention is capable of being carried out in many embodiments which are different from those shown and described herein. Thus, the details of the method and the tool structure and tool inserts can be changed in various manners without departing from the scope of this invention. Accordingly, the drawings and description are to be regarded as illustrative in nature and are not to restrict the scope of this invention. Additionally, the claims are to be regarded as including such equivalent methods, tool structures and tool inserts as do not depart from the nature and scope of this invention.

BRIEF DESCRIPTION OF THE DRAWINGS

For a more complete understanding and appreciation of this invention, and many of its advantages, reference will be made to the following detailed description taken in conjunction with the accompanying drawings:

FIG. 3 is an outside side view of a branching runner branching into a pair of branch runners;

FIG. 3A is a conceptual, cross sectional view representation of a runner depicting relative zones of laminar shear prior to branching;

FIG. 3B is a conceptual, cross sectional view representation of a runner depicting relative zones of laminar shear after branching from a branching runner;

FIG. 3C is a conceptual, cross sectional view representation of a runner depicting relative zones of laminar shear after branching from a branching runner;

FIG. 3D is a conceptual, cross sectional view representation of a runner depicting relative zones of laminar shear after branching from a branching runner;

FIG. 9A is a conceptual, perspective view of a runner system having two branched runners according to one embodiment of this invention;

FIG. 9B is a conceptual, perspective view of the runner system of FIG. 9A;

FIG. 9C is a conceptual, perspective view of the runner system of FIG. 9A;

FIG. 9D is a conceptual, perspective view of the runner system of FIG. 9A;

FIG. 10A is a conceptual, cross sectional view representation of a runner depicting relative zones of laminar shear after branching from a branching runner;

FIG. 10B is a conceptual, cross sectional view representation of a runner depicting relative zones of laminar shear after branching from a branching runner;

FIG. 10C is a conceptual, cross sectional view representation of a runner depicting relative zones of laminar shear after branching from a branching runner;

FIG. 11A is a conceptual, perspective view of a branched runner system according to one embodiment of the invention;

FIG. 11B is a conceptual, perspective view of the branched runner system of FIG. 11A;

FIG. 11C is a conceptual, perspective view of the branched runner system of FIG. 11A;

FIG. 11D is a conceptual, perspective view of the branched runner system of FIG. 11A;

FIG. 11E is a conceptual, perspective view of the branched runner system of FIG. 11A;

FIGS. 12A–J depict many separate embodiments of this invention;

DETAILED DESCRIPTION OF PREFERRED EMBODIMENTS

Figure 1:
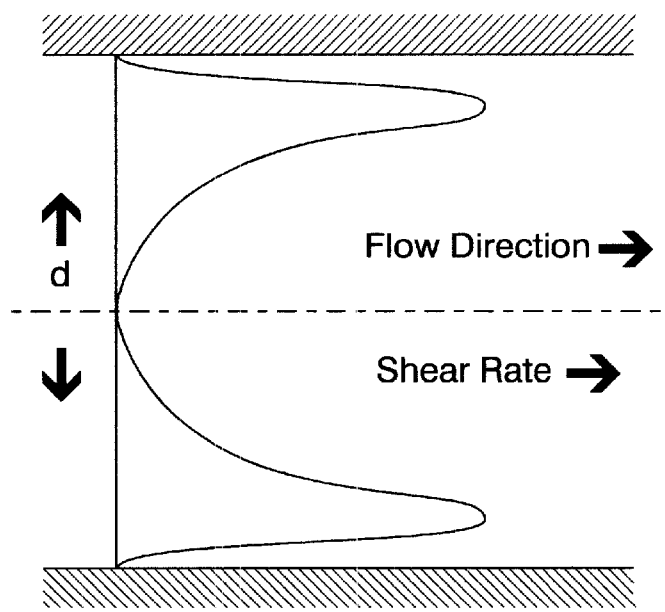
FIG. 1 is a conceptual, cross sectional representation of the development of shear in a runner along the flow path of the runner.
Figure 2:
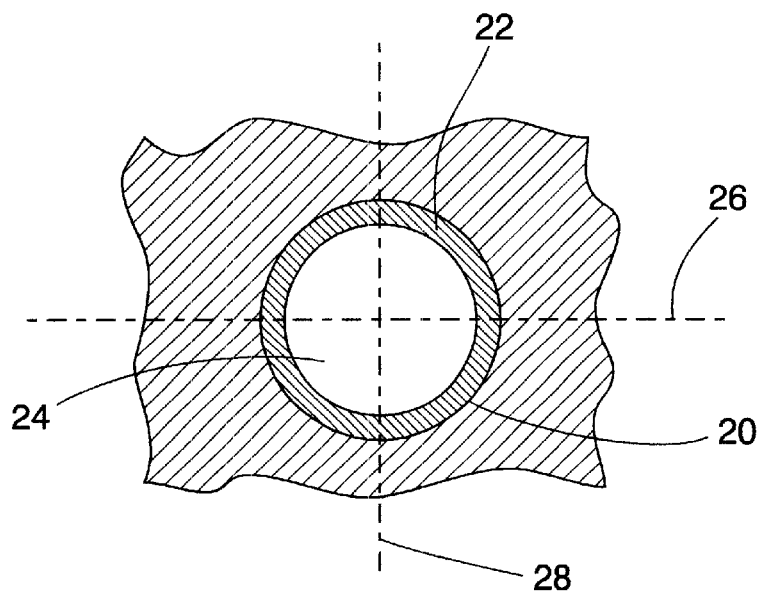
FIG. 2 is a conceptual, cross sectional view representation of a runner depicting relative zones of laminar shear prior to branching.
Figure 4:
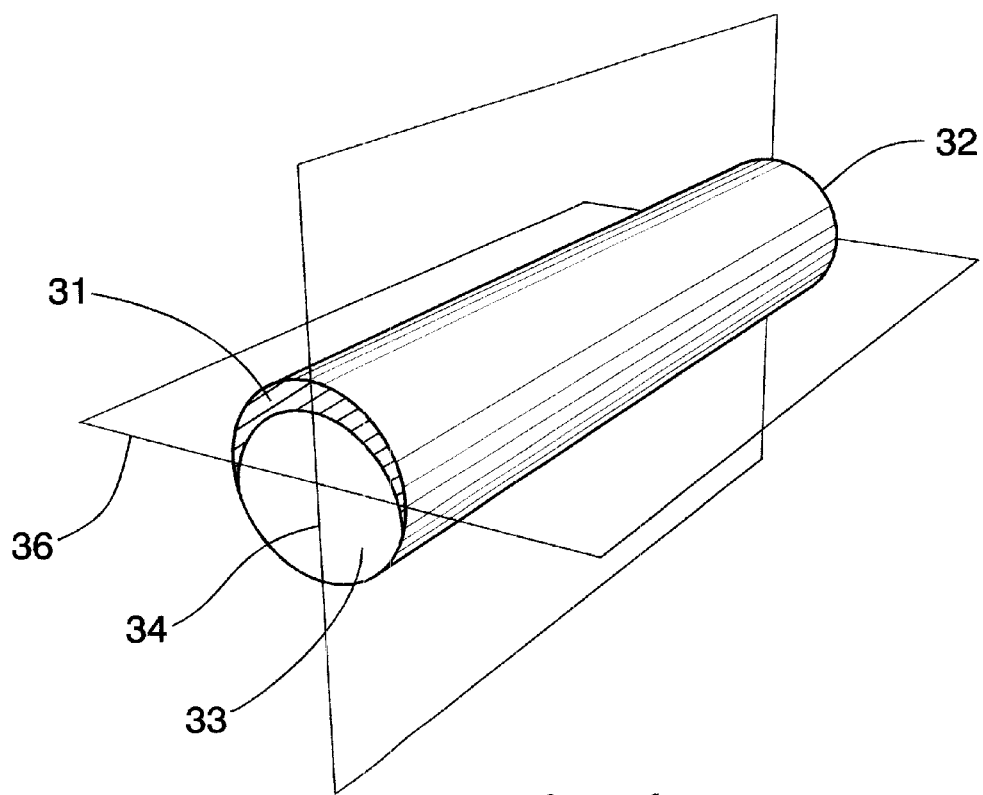
FIG. 4 is a conceptual, outside perspective view representation of laminar material conditions in a runner.

Referring to the drawings, identical reference numerals designate the same or corresponding part throughout the several figures shown in the drawings.

Referring now to FIG. 9A, a tool structure or tool insert has a runner system 200 which includes a branching runner 202 which branches into a pair of branch runners 204 and 206 for receiving laminar flowing material for the formation of a product by the tool or by some apparatus used in conjunction with the tool. The branch runners 204 and 206 are joined together at runner 208.

Figure 5:
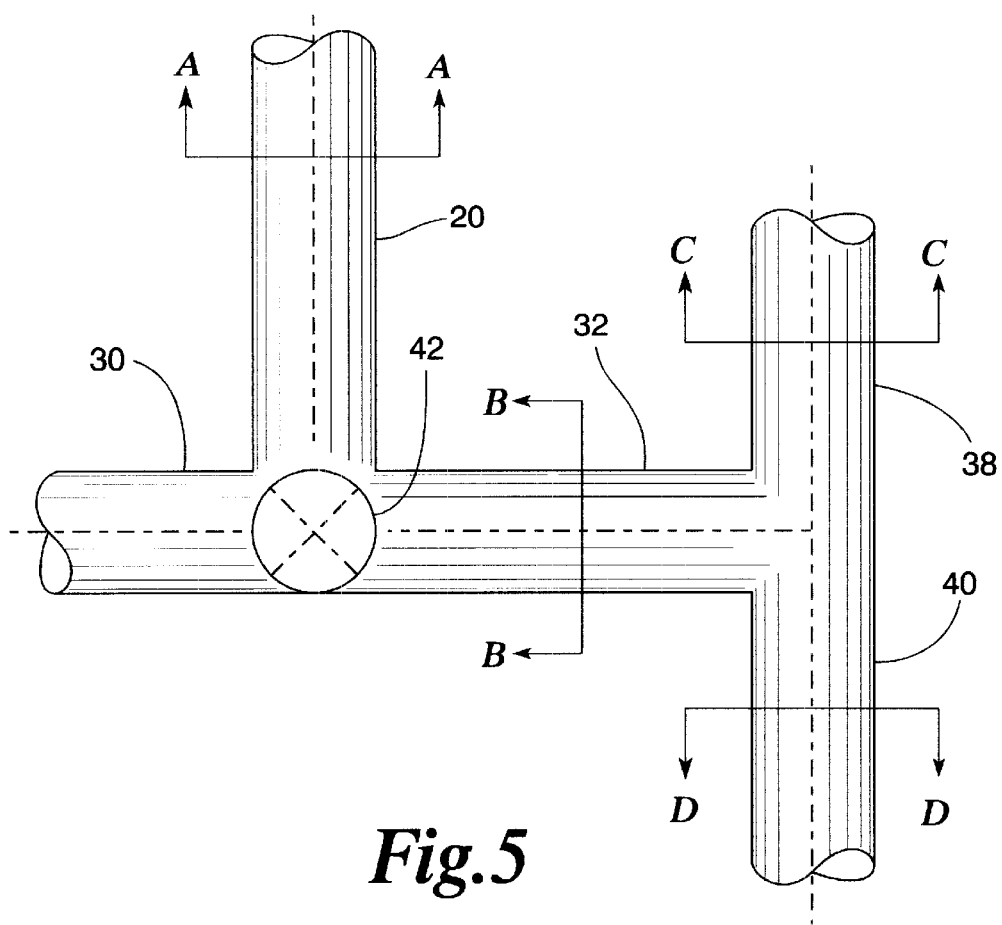
FIG. 5 depicts a runner system having a repositioner.
Figure 5A:
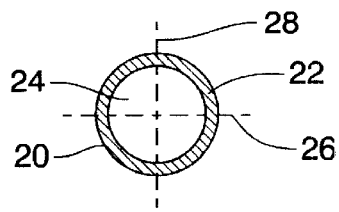
FIG. 5A is a conceptual, cross sectional view representation of a runner depicting relative zones of laminar shear prior to branching.
Figure 5B:
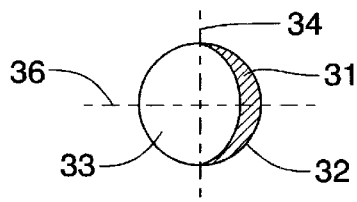
FIG. 5B is a conceptual, cross sectional view representation of a runner depicting relative zones of laminar shear after branching from a branching runner and after utilizing the repositioner.
Figure 5C:
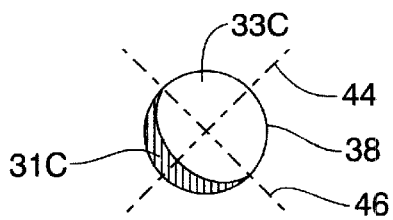
FIG. 5C is a conceptual, cross sectional view representation of a runner depicting relative zones of laminar shear after branching from a branching runner and after utilizing the repositioner.
Figure 5D:
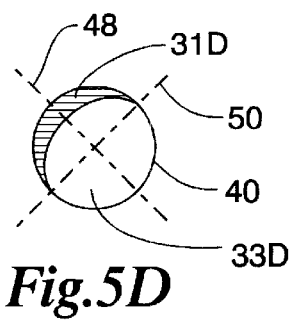
FIG. 5D is a conceptual, cross sectional view representation of a runner depicting relative zones of laminar shear after branching from a branching runner and after utilizing the repositioner.
Figure 6:
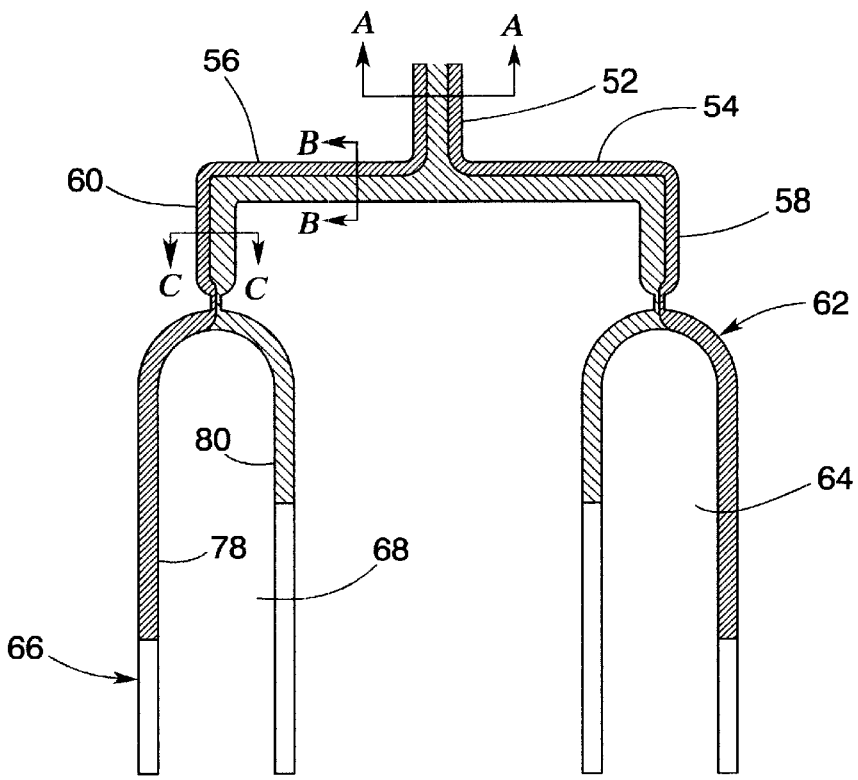
FIG. 6 is a conceptual, cross sectional view of a branched laminar material flow depicting relative zones of laminar shear before and after branching and representing the effect of high shear on the filling of cavities.
Figure 6A:
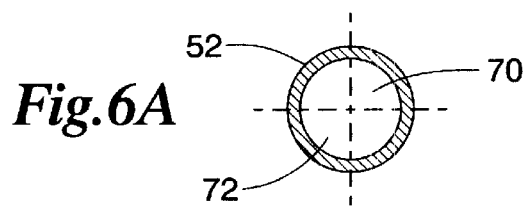
FIG. 6A is a conceptual, cross sectional view representation of a runner depicting relative zones of laminar shear prior to branching.
Figure 6B:
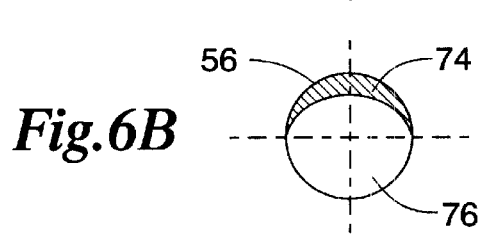
FIG. 6B is a conceptual, cross sectional view representation of a runner depicting relative zones of laminar shear after branching from a branching runner.
Figure 6C:
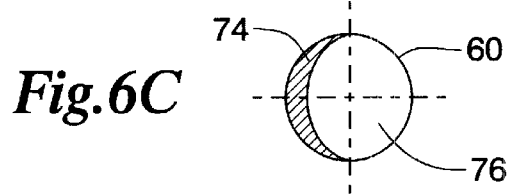
FIG. 6C is a conceptual, cross sectional view representation of a runner depicting relative zones of laminar shear after branching from a branching runner.
Figure 6D:
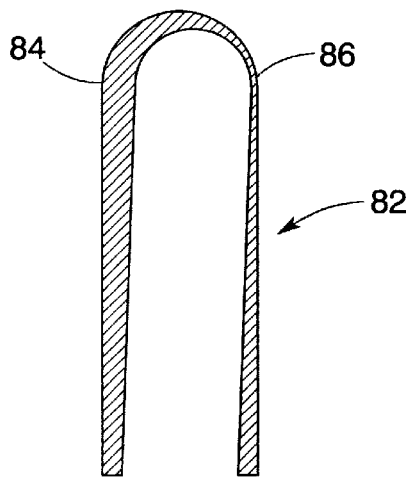
FIG. 6D is a cross sectional representation of core deflection on a filled cavity resulting from high sheared material on one side of a runner and low sheared material on the other side of the same runner.
Figure 7:
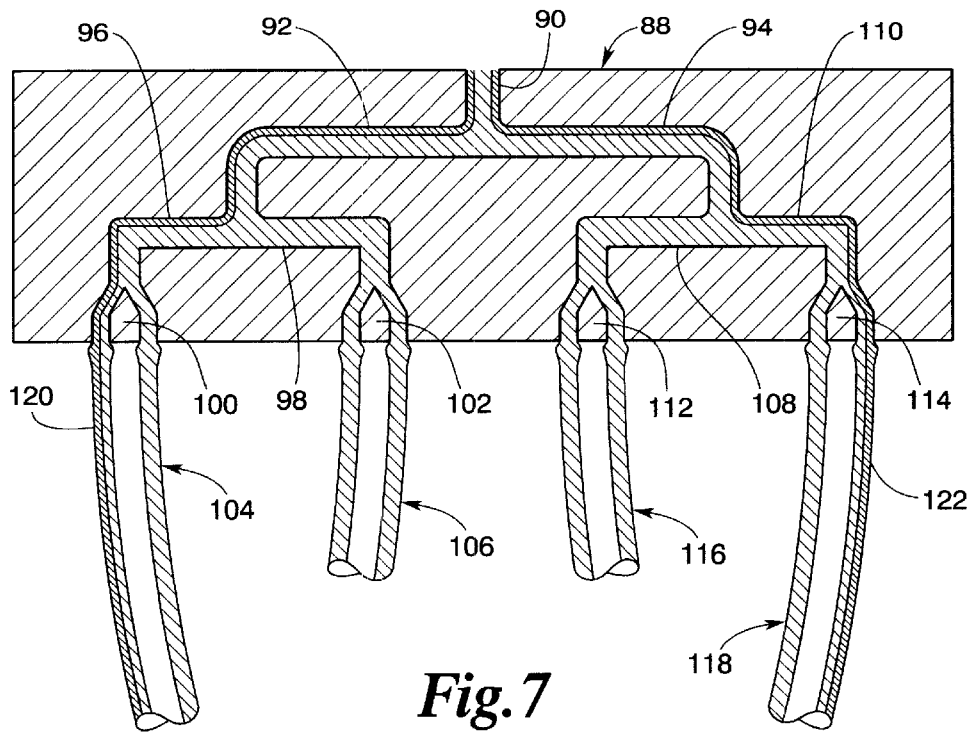
FIG. 7 is a conceptual, cross sectional view of a runner system in a die for making four parisons in an extrusion blow molding process.
Figure 8:
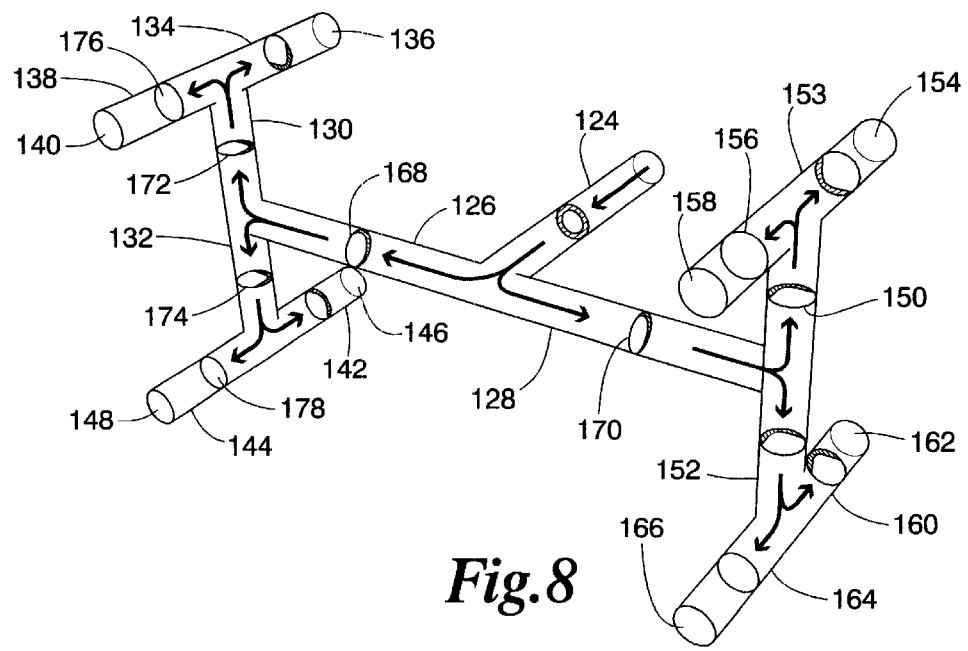
FIG. 8 is a conceptual, perspective view of one type of a stack mold system having two parting planes.

The branching runner 202 is connected to the branch runners 204 and 206 through a repositioner 210 which is made and which operates according to the teachings of the Beaumont Patent. The operation of such a repositioner was described with respect to repositioner 42 shown in FIG. 5 and repositions dissimilar conditions of the laminar flowing material from runner 202 in circumferential directions to preselected positions around the centers of the flow paths of each of the runners 204 and 206 while maintaining continuity between laminates of the material from the center through the perimeter of each runner.

During the operation of the tool in which the runner system 200 is installed, a stream of laminar flowing fluid having shear conditions shown at Section 212 in FIG. 9A flows through runner 202. Section 212 is more clearly shown in FIG. 10A. High sheared material 214 and low sheared material 216 are shown to be significantly similar from side-to-side of a plane 218 which bisects a cross section of the runner 202. In point of fact, the high sheared conditions 214 and the low sheared conditions 216, as shown in Section 212, are symmetrical about the plane 218 as these conditions may be for many applications of the invention. Additionally, the high sheared conditions 214 and the low sheared conditions 216 are dissimilar from side-to-side of a plane 220 which is perpendicular to the plane 218 and which also bisects the cross section of the length of the runner 202.

Referring again to FIG. 9A along with FIG. 10A, if the runner 202 did not join the branch runners 204 and 206 through the repositioner 210, the high sheared conditions and the low sheared conditions of the laminar flowing material from the runner 202 would have shapes and positions in the branch runners 204 and 206 which are substantially in the form shown in hypothetical cross sections 222 and 224, respectively, shown only in FIG. 10A. The high sheared conditions 226 and low sheared conditions 228 shown in the hypothetical cross section 222 of branch runner 204 are significantly similar from side-to-side of a bisecting plane 230 which bisects a cross section of branch runner 204, while the high sheared conditions 226 and low sheared conditions 228 are dissimilar from side-to-side of a plane 232 which is perpendicular to the plane 230 and which also bisects the cross section of the branch runner 204. Similarly, as shown in hypothetical cross section 224 of FIG. 10A, the high sheared conditions 234 and the low sheared conditions 236 of runner 206 are significantly similar from side-to-side of a plane 238 which bisects a cross section of branch runner 206 and are dissimilar from side-to-side of a plane 240 which is perpendicular to the plane 238 which also bisects the cross section of branch runner 206. The planes 230 and 238 about which the shear conditions of the branch runners 204 and 206, respectively, are shown to be significantly similar in the hypothetical cross sections 222 and 224 are each at an angle of about 45° from the top dead center of their respective branch runners.

However, the respositioner 210 repositions the dissimilar shear conditions of the lamninar flowing material in circumferential directions to preselected positions around the centers of the flow paths of each of the branch runners 204 and 206. Referring to FIG. 9B, Section 242 represents the actions of the repositioner 210 in repositioning the dissimilar shear conditions of the laminar flowing material. Referring now to FIG. 9C along with FIG. 10A, Sections 244 and 246 depict the preselected positions around the centers of the flow paths of the runners 204 and 206, respectively, to which the high sheared material 226 and the low sheared material 228 of branch runner 204 and the high sheared material 234 and the low sheared material 236 of the branch runner 206 have been rotated. The high sheared conditions 226 and the low sheared conditions 228 of branch runner 204 are shown in Section 244 to be significantly similar from side-to-side of a plane 248 which bisects the cross section of the runner 204 and are dissimilar from side-to-side of a plane 250 which is perpendicular to the plane 248 and which also bisects the cross section of branch runner 204. Similarly, the high sheared conditions 234 and low sheared conditions 236 of the laminar flowing material in branch runner 206 are significantly similar from side-to-side of a plane 252 which bisects the cross section of branch runner 206 and are dissimilar from side-to-side of a plane 254 which is perpendicular to the plane 252 and which also bisects the cross section of branch runner 206.

Referring to FIG. 10A, a comparison of the position of the plane 230 in Section 222 with the position of the plane 248 in Section 244 shows that the repositioner 210 has repositioned the sheared conditions of the laminar flowing material in the branch runner 204 in a counterclockwise direction about the center of the flow path of the material about 45° from the position at which they would have been in the branch runner 204 without the repositioner 210. Additionally, a comparison of the position of the plane 238 in Section 224 with the position of the plane 252 in Section 246 shows that the sheared conditions of the laminar flowing material in branch runner 206 have been repositioned in a clockwise direction about the center of the flow path of the material about 45° from the position at which they would have been in the branch runner 206 without the use of the repositioner 210. The repositioner 210 could have been constructed to reposition the dissimilar sheared conditions to a greater or a lesser extent necessary to move them to the desired positions in the branch runners 204 and 206.

Referring now to FIG. 9D along with FIG. 10A, the branch runners 204 and 206 are joined together at a location on each runner which causes the flow of laminar flowing material from each runner, as shown in Sections 244 and 246 of FIG. 10A, to form half of a joint stream of material which flows through runner 208. Due to the preselected positions to which the dissimilar conditions of laminar flowing material have been repositioned around the centers of the flow paths of the runners 204 and 206, which have caused the crescent of high sheared material 226 in branch runner 204 to be centered at 270° from top dead center in a clockwise direction of branch runner 204 and have caused the crescent shaped high sheared conditions 234 in branch runner 206 to be centered at 90° from top dead center in a clockwise direction of branch runner 206, the conditions across the joint flow path of runner 208, as shown in Section 256, are significantly balanced from side-to-side of two perpendicular planes 258 and 260 which bisect the cross section of the flow path of the laminar flowing material in runner 208. While the dissimilar shear conditions are shown to be symmetrical about the perpendicular planes 258 and 260, symmetry may not be necessary for some applications of the invention, as long as the amounts of each of the high sheared conditions 226 and the low sheared conditions 228 are close enough to being equal that the differences do not significantly affect a product being formed.

Figure 13A:
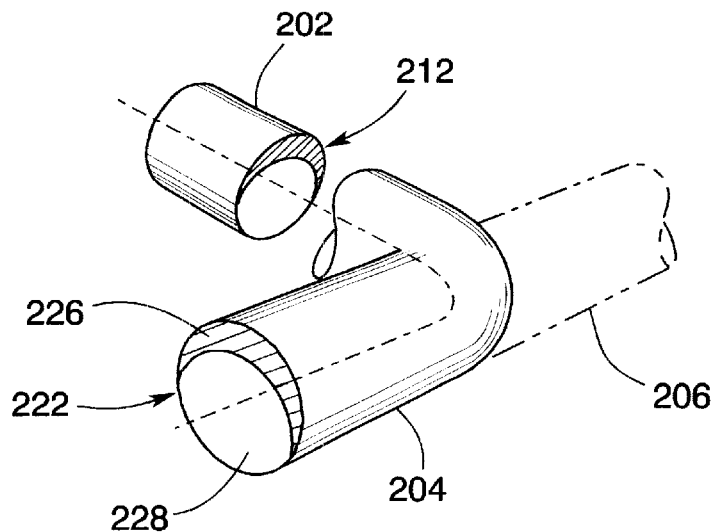
FIG. 13A is a perspective view of a change in direction of a runner.
Figure 13B:
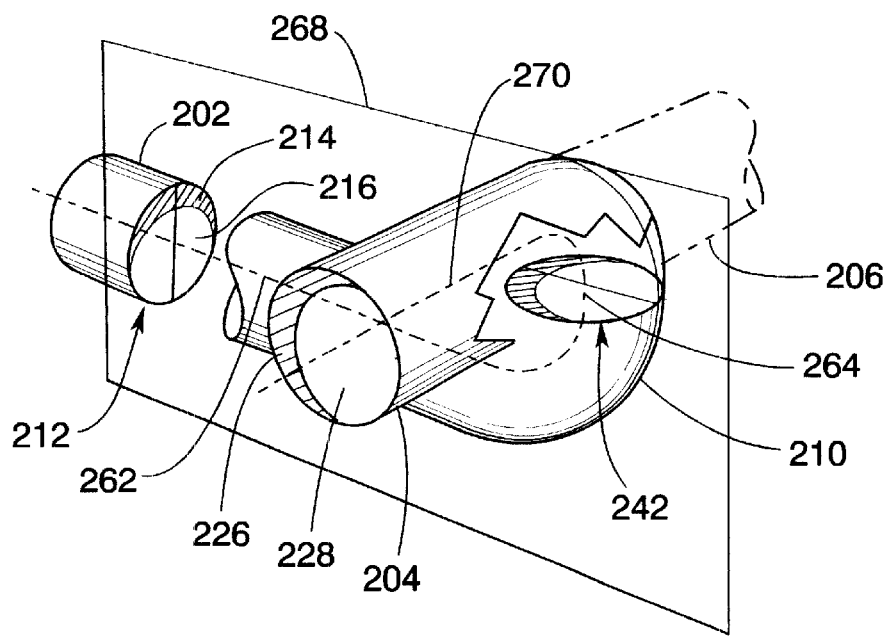
FIG. 13B is a perspective view of a repositioner.

The repositioner 210 could be any type of repositioner found to be useful in accordance with the teachings of the Beaumont Patent. However, the repositioner 210 shown in FIGS. 9A–9D is a type of repositioner which relies on elevation differences between two intersecting runner sections which cause laminar flowing material to follow a flow path from one intersecting runner section, through the elevation change which is in a direction that is not common to either of the intersecting runner sections, and thereafter through the second intersecting runner in a flow direction which is at an angle to a plane which includes the centerlines of the material flow through the first intersecting runner section and the elevation change. As shown in FIG. 13B, Section 212 shows the position of the high sheared conditions 214 and the low sheared conditions 216 of the material in the flow path of branch runner 202. The flow path of the material has a centerline 262 within the runner 202 and has a centerline 264 through an elevation change between runner 202 and branch runner 204. A plane 268 extends through the centerlines 262 of the runner 202 and 264 of the elevation change. The laminar flowing material then follows a flow path within the branch runner 204 which has a centerline 270 which is not on the plane 268, but extends at an angle from the plane 268.

As a result, the respositioner 210 repositions the high sheared conditions 226 and the low sheared conditions 228 by an amount determined by the size of the angle between the centerline 262 of the material flow path through runner 202 and the centerline 264 of the flow path through the elevation change and the size of the angle between the centerline 270 of the flow path of the material through branch runner 204 and the plane 268 which extends through the centerlines 262 and 264 and by the amount of elevation in the repositioner 210 that joins runner 202 and branch runner 204 and branch runner 206. FIG. 13A, by way of comparison, includes Section 222 from FIG. 10A which shows the approximate position of the high sheared conditions 226 and low sheared conditions 228 in branch runner 204 without the use of the repositioner 210.

FIGS. 11A–11E show another of the many possible embodiments of this invention and will be explained in conjunction with FIG. 10B. Referring first to FIG. 11A, a single branching runner 272 branches in two directions through runners 274 and 276, into two pairs of branch runners, one pair consisting of branch runners 278 and 280 and the other pair consisting of branch runners 282 and 284. A repositioner 286 extends between runner 276 and branch runners 278 and 282, while a repositioner 288, which is not clearly shown in FIG. 11A, extends between runner 274 and branch runners 280 and 284. The branch runners 278 and 280 are joined together at runner 290 where a first joint stream of laminar flowing material is formed from the material flowing through each of these branch runners. Similarly, branch runners 282 and 284 are joined at runner 292 where a second joint stream of laminar flowing material is formed from the material flowing through branch runners 282 and 284.

Section 294, shown in FIG. 11A and FIG. 10B, shows that the dissimilar conditions of the laminar flowing material in runner 272 are symmetrical about planes 296 and 298 which bisect the runner 272. According to the principles explained above, these dissimilar conditions of laminar flowing material take a form shown generally at Sections 300 in FIG. 11B and FIG. 10B. As shown, high sheared conditions 302 and low sheared conditions 304 are significantly similar from side-to-side of a bisecting plane 306 and are dissimilar from side-to-side of a plane 308 which is perpendicular to the plane 306 which is also a bisecting plane. FIG. 11C depicts the action of repositioners 286 and 288 in repositioning the dissimilar conditions of the laminar flowing material from runners 276 and 274, respectively, to preselected positions around the centers of the flow paths of the branch runners 278 and 282 by repositioner 286, and the branch runners 280 and 284 by repositioner 288, while maintaining continuity between laminates of the material from the center to the perimeter of each runner.

Referring again to FIG. 10B, Sections 310 and 312 show the positions which the dissimilar conditions of the material would take in each pair of the branch runners 278 and 280 and branch runners 282 and 284, without the effects of the repositioners 286 and 288. Thus, Section 310 shows there would be significantly similar laminar material conditions from side-to-side of a bisecting plane 314 which bisects the cross section of at least a portion of the length of one branch runner of each pair of branch runners, and dissimilar conditions from side-to-side of a plane 316 which is perpendicular to the bisecting plane 314 and which also bisects the cross section of the same portion of the length of the branch runner as does plane 314. Similarly, Section 312 shows there would be significantly similar conditions from side-to-side of a bisecting plane 318 which bisects the cross section of at least a portion of the length of the second branch runner of each pair of branch runners, the material also having dissimilar conditions from side-to-side of a plane 320 which is perpendicular to plane 318 and which also bisects the cross section of the same portion of the length of that branch runner as does the bisecting plane. This is not to suggest that any bisecting plane of a cross section of a portion of the length of any single branch runner would necessarily bisect a cross section of a portion of the length of any other branch runner. The reference to bisecting planes and perpendicular planes is merely for the purpose of explaining the positions of the dissimilar shear conditions of the material at a portion of the length of a particular runner.

Referring to FIG. 11D, Sections 324 and 326 show the positions of the dissimilar conditions of the material laminates after these conditions have been repositioned by repositioner 286 and 288. As with the conditions shown in the other sections, these conditions are significantly similar from side-to-side of bisecting planes 328 and 330, as shown in FIG. 10B, and are dissimnilar from side-to-side of planes 332 and 334 which are perpendicular to bisecting planes 328 and 330, respectively, as shown in FIG. 10B. The same conditions are true with respect to the conditions shown in Sections 324' and 326' in the branch runners 282 and 284, respectively.

Referring now to FIG. 11E along with FIG. 10B, branch runners 278 and 280 are joined at a location on each runner which causes the flow from each runner to form a half of a joint stream of material which, due to the preselected positions, shown in Sections 324 and 326, shown in FIG. 10B, to which the dissimilar conditions of the laminar flowing material have been repositioned around the centers of the flow paths of each runner 278 and 280, shown in FIG. 11E, has conditions across its flow path, shown in Section 336, which are significantly balanced from side-to-side of two perpendicular planes 340 and 338 which bisect the cross section of runner 290. A second joint stream of material with the same significantly balanced conditions across two perpendicular planes is formed by the branch runners 282 and 284 and the runner 292 as shown in Section 336' in FIG. 11E.

A comparison of FIG. 10A and FIG. 10B shows that the embodiment of this invention depicted in FIGS. 9A–9D places the high sheared laminates near the outside perimeter of the joint stream of material, while the embodiment of this invention shown in FIGS. 11A–11E has the high sheared material at the top, bottom and in the middle of the joint stream. The relative positions of the high sheared material could be reversed for either of these configurations by causing the repositioners to provide their repositioning actions from above the branched runners, rather than from below as shown.

FIG. 10C shows a representation of Sections of the embodiment of this invention depicted in FIGS. 9A–9D in which the dissimilar laminar conditions in branch runner 206 are rotated in the same direction as are the conditions in branch runner 204, rather than in opposite directions. As a result, the Section 246' shows that the high sheared conditions in both branch runner 204 and branch runner 206 are centered on the left side of these sections after they have been rotated. Thus, Section 340 in FIG. 10C shows that these conditions are substantially similar about planes 342 and 344 which bisect the cross section of the runner 208. As indicated above, for some applications of this invention, it may not be necessary to the final product that the conditions be symmetrical from side-to-side about the two perpendicular planes 342 and 344.

Figure 12D:
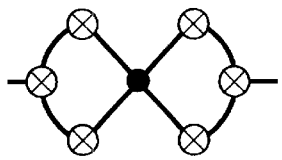
Figure 12E:
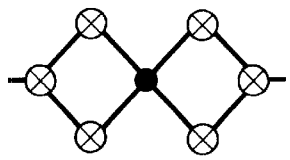
Figure 12F:
Figure 12G:
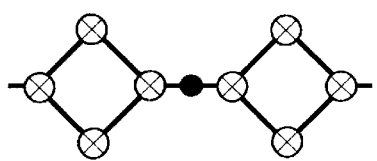
Figure 12H:
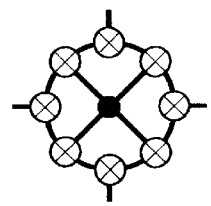
Figure 12I:
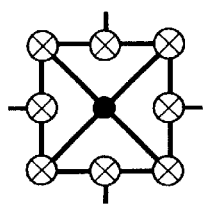
Figure 12J:
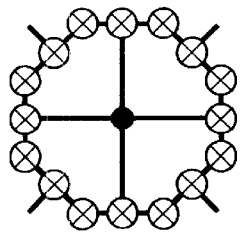

FIGS. 12A–12J show a number of separate configurations in which this invention could provide one or more streams of laminar flowing material having dissimilar conditions across their all flow path which are significantly balanced from side-to-side of two perpendicular planes which bisect the cross section of at least a portion of that flow path immediately downstream of where each such stream of material is formed. The circles marked with an "X" in each of these figures represent a location where a repositioner of the type disclosed in the Beaumont Patent could be placed to reposition dissimilar conditions of laminar flowing material to preselected positions in accordance with this invention. FIG. 12A represents the embodiment of this invention which was disclosed in FIGS. 9A–9D and is numbered accordingly by way of example. However, the optional repositioner shown at the junction of branch runners 204 and 206 and runner 208 was not used in the embodiment of the invention shown FIGS. 9A–9D.

Similarly, the embodiment of the invention shown in FIGS. 11A–11E is depicted in FIG. 12B and is numbered accordingly. It should be noted that the optional repositioners at the junction of branch runners 278 and 280 with runner 290 and at the junction of branch runners 282 and 284 with runner 292 were not used in the embodiment shown in FIGS. 12A–12D. FIG. 12C is identical to FIG. 12B, except that the branch runners are constructed with 90° angles.

In each of the embodiments shown in FIGS. 12B–12J the black dots represent a runner which flows laminar flowing material to at least one pair of branch runners. These runners branch in two directions and form two pairs of branch runners and two joint, significantly balanced streams of material in FIGS. 122B, 12C and 12G. These runners branch in four directions and form two pairs of branch runners forming providing two separate streams of material which are significantly balanced in accordance with this invention in FIGS. 12D, 12E and 12F. The primary runners branch in four directions and form four pairs of branch runners which produce four streams of significantly balanced material in the embodiments of this invention shown in FIGS. 12H, 12I and 12J.

This invention has been described with reference to several preferred embodiments. Many modifications and alterations will occur to others upon reading and understanding the preceding specification. It is intended that the invention be constructed as including all such alterations and modifications in so far as they come within the scope of the appended claims or the equivalents of these claims.

What is claimed is:

1. A method of producing significantly balanced conditions of concentric laminates of a stream of laminar flowing material from conditions which are significantly similar from side-to-side of a first plane which bisects a cross section of a flow path of the material in a tool and which are dissimilar from side-to-side of a second plane, perpendicular to the first plane, which also bisects the same cross section of the flow path of the material, so as to affect the formation of a product, comprising:

providing a tool having a runner system which includes at least one branching runner which branches in at least two directions forming at least one pair of branch runners for receiving laminar flowing material for the formation of a product;

flowing a stream of laminar flowing material in a flow path which includes each branch runner of the runner system, the material flowing through each branch runner having significantly similar conditions from sideto-side of a bisecting plane of that branch runner which bisects the cross section of at least a portion of the length of that branch runner, and the material having dissimilar conditions from side-to-side of a second plane which is perpendicular to the bisecting plane of each branch runner and which also bisects the cross section of the same portion of the length of that branch runner as does the bisecting plane of that branch runner;

repositioning the dissimilar conditions of the laminar flowing material in circumferential directions to preselected positions around the centers of the flow paths of each runner of each pair of branch runners while maintaining continuity between laminates of the material from the center through the perimeter of each runner; and joining each pair of branch runners at a location on each runner of each pair which causes the flow from each runner to form a half of a joint stream of material which, due to the preselected positions to which the dissimilar conditions of the laminar flowing material have been repositioned around the centers of the flow paths of each runner of each pair of branch runners, has conditions across its flow path that are significantly balanced, but not necessarily symmetrical, from side-to-side of two perpendicular planes which bisect the cross section of at least a portion of the flow path of the material immediately downstream of where the joint stream of the material is formed.

2. A method of producing significantly balanced conditions of concentric laminates of a stream of laminar flowing material according to claim 1 wherein the repositioning of the dissimilar conditions of the laminar flowing material in a circumferential direction occurs in each branch runner through a first change in direction of the flow path of the material along a first plane which includes the centerline of the flow path of the material immediately before the first change in direction of the flow path and the centerline of the flow path of the material immediately after the first change in direction of the flow path, followed by a second change in direction of the flow path of the material, downstream of the first change in direction, which occurs in a direction which is not along the first plane.

3. A method of producing significantly balanced conditions of concentric laminates of a stream of laminar flowing material according to claim 1 wherein the repositioning of the dissimilar conditions of the lamninar flowing material in a circumferential direction occurs in each branch runner through a first change in direction of the flow path of the material along a first plane which includes the centerline of the flow path of the material immediately before the first change in direction of the flow path and the centerline of the flow path of the material immediately after the first change in direction of the flow path, followed by a second change in direction of the flow path of the material, downstream of the first change in direction, which occurs in a direction which is not along the first plane, and includes selecting flow angles at the first change in direction of the flow path and at the second change in direction of the flow path to cause a predetermined amount of repositioning to occur.

4. A method of producing significantly balanced conditions of concentric laminates of a stream of laminar flowing material according to claim I which includes repositioning the dissimilar conditions of the laminar flowing material of each runner of each pair of branch runners at a location of the runner system about where this pair of branch runners branches from a branching runner.

5. A method of producing significantly balanced conditions of concentric laminates of a stream of laminar flowing material according to claim 1 which includes repositioning the dissimilar conditions of the laminar flowing material of each runner of each pair of branch runners at a location of the runner system about where this pair of branch runners is joined to form a joint stream of material.

6. A method of producing significantly balanced conditions of concentric laminates of a stream of laminar flowing material according to claim 1 which includes repositioning the dissimilar conditions of the laminar flowing material of each runner of each pair of branch runners at a location in each branch runner which is between a location of the runner system where this pair of branch runners branch from a branching runner and a location in the runner system where this pair of branch runners is joined to form a joint stream of material.

7. A method of producing significantly balanced conditions of concentric laminates of a stream of laminar flowing material according to claim 1 in which the repositioning of the dissimilar conditions of the laminar flowing material occurs at more than one location with respect to each branch runner in at least one pair of branch runners.

8. A method of producing significantly balanced conditions of concentric laminates of a stream of laminar flowing material according to claim 1 in which the repositioning of dissimilar conditions of the laminar flowing material in one runner of each pair of branch runners occurs in a circumferential direction which is opposite from the circumferential direction in which the repositioning occurs in the other runner of this pair of branch runners.

9. A method of producing significantly balanced conditions of concentric laminates of a stream of laminar flowing material according to claim 1 in which the repositioning of dissimilar conditions of the laminar flowing material in one runner of each pair of branch runners occurs in a circumferential direction which is opposite from the circumferential direction in which the repositioning occurs in the other runner of this pair of branch runners, so that the flow from each runner of this pair of branch runners causes the conditions across the flow path of the joint stream of material to be symmetrical from side-to-side of two perpendicular planes which bisect the cross section of at least a portion of the flow path of the material immediately downstream of where the joint stream of the material is formed.

10. A method of producing significantly balanced conditions of concentric laminates of a stream of laminar flowing material according to claim 1 in which the repositioning of dissimilar conditions of the laminar flowing material in one runner of each pair of branch runners occurs in a circumferential direction which is the same circumferential direction in which repositioning occurs in the other runner of this pair of branch runners.

11. A method of producing significantly balanced conditions of concentric laminates of a stream of laminar flowing material according to claim 1 which includes providing the tool with a single branching runner which branches into a single pair of branch runners, the pair of branch runners forming a single joint stream of material which is significantly balanced, but not necessarily symmetrical, from side-to-side of two perpendicular planes which bisect the cross section of at least a portion of the flow path of the material immediately downstream of where the joint stream of material is formed.

12. A method of producing significantly balanced conditions of concentric laminates of a stream of laminar flowing material according to claim 1 which includes providing the tool with one branching runner which branches in two directions forming two pairs of branch runners, each pair of branch runners forming a separate joint stream of material which is significantly balanced, but not necessarily symmetrical, from side-to-side of two perpendicular planes which bisect the cross section of at least a portion of the flow path of the material immediately downstream of where the joint stream of material is formed.

13. A method of producing significantly balanced conditions of concentric laminates of a stream of laminar flowing material according to claim 1 which includes providing the tool with at least two pairs of branch runners, each of which is formed from a separate branching runner, each pair of branch runners forming a separate joint stream of material which is significantly balanced, but not necessarily symmetrical, from side-to-side of two perpendicular planes which bisect the cross section of at least a portion of the flow path of the material immediately downstream of where the joint stream of material is formed.

14. A method of producing significantly balanced conditions of concentric laminates of a stream of lamninar flowing material according to claim 1 which includes providing the tool with one branching runner which branches in four directions forming at least two pairs of branch runners, each pair of branch runners forming a separate joint stream of material which is significantly balanced, but not necessarily symmetrical, from side-to-side of two perpendicular planes which bisect the cross section of at least a portion of the flow path of the material immediately downstream of where the joint stream of material is formed.

15. A method of producing significantly balanced conditions of concentric laminates of a stream of laminar flowing material according to claim 1 which includes providing a tool with one branching runner which branches in four directions forming four pairs of branch runners, each pair of branch runners forming a separate joint stream of material which is significantly balanced, but not necessarily symmetrical, from side-to-side of two perpendicular planes which bisect the cross section of at least a portion of the flow path of the material immediately downstream of where the joint stream of material is formed.

16. A tool which produces significantly balanced conditions of concentric laminates of a stream of laminar flowing material for the formation of a product, comprising:

a runner system which receives laminar flowing material in said tool, said runner system including at least one branching runner which branches in at least two directions to form at least one pair of branch runners, said branch runners each providing part of a flow path for the laminar flowing material, the laminar flowing material having significantly similar conditions form side-to-side of a first bisecting plane in each branch runner, the first bisecting plane of each branch runner bisecting the cross section of at least a portion of the length of that branch runner, the laminar flowing material having dissimilar conditions from side-to-side of a second plane which is perpendicular to the first bisecting plane of that branch runner and which also bisects the cross section of the same portion of the length of that branch runner as does the first bisecting plane of that branch runner;

a repositioner in each runner of each pair of branch runners which repositions the laminar flowing material in circumferential directions to preselected positions around the centers of the flow paths of each runner of each pair of branch runners while maintaining continuity between laminates of the flowing material from the center through the perimeter of each runner; and a junction of each pair of branch runners at a location on each branch runner of each pair which causes laminar flowing material from each branch runner to form a half of a joint stream of flowing material in a joint flow path, and, due to the preselected positions to which the dissimilar conditions of the laminar flowing material have been repositioned around the centers of the flow paths of each runner of each pair of branch runners, said joint flow path has conditions across it that are significantly balanced, but not necessarily symmetrical, from side-to-side of two perpendicular planes which bisect the cross section of at least a portion of said joint flow path immediately downstream of said junction.

17. The tool which produces significantly balanced conditions of concentric laminates of a stream of laminar flowing material of claim 16 wherein each said repositioner comprises a first change in direction of the flow path of the flowing material along a first plane which includes the centerline of the flow path of the flowing material immediately before said first change in direction and the centerline of the flow path of the flowing material immediately after said first change in direction, and followed by a second change in direction of the flow path located downstream of said first change in direction, which occurs in a direction which is not along said first plane so as to reposition the dissimilar conditions of the laminar flowing material in a circumferential direction.

18. The tool which produces significantly balanced conditions of concentric laminates of a stream of laminar flowing material of claim 16 wherein each said repositioner comprises a first change in direction of the flow path of the flowing material along a first plane which includes the centerline of the flowing material immediately before said first change in direction of the flow path and the centerline of the flow path of the flowing material immediately after said first change in direction of the flow path, followed by a second change in direction of the flow path of the flowing material, downstream of said first change in direction, which occurs in a direction which is not along said first plane, said first change in direction and said second change in direction of the flow path having preselected flow angles which cause a predetermined amount of repositioning of the dissimilar conditions of the laminar flowing material to occur in a circumferential direction.

19. The tool which produces significantly balanced conditions of concentric laminates of a stream of laminar flowing material according to claim 16 wherein each repositioner is at a location of said tool about where a pair of branch runners branches from said branching runner.

20. The tool which produces significantly balanced conditions of concentric laminates of a stream of laminar flowing material according to claim 16 wherein each repositioner is located at about the junction of a pair of branch runners where the junction forms a joint stream of material.

21. The tool which produces significantly balanced conditions of concentric laminates of a stream of laminar flowing material according to claim 16 wherein each repositioner is at a location in a branch runner of a pair of branch runners which is between a location in said tool where said pair of branch runners branch from said at least one branching runner and a location in said tool where said branch runners join to form a joint stream of material.

22. The tool which produces significantly balanced conditions of concentric laminates of a stream of laminar flowing material according to claim 16 wherein a repositioner in each of at least one pair of branch runners includes components that are located in multiple locations of that runner.

23. The tool which produces significantly balanced conditions of concentric laminates of a stream of laminar flowing material according to claim 16 wherein the repositioner in a first runner of at least one pair of branch runners repositions the dissimilar conditions of the laminar flowing material in a first circumferential direction, and the repositioner in the second runner of the at least one pair of branch runners repositions the dissimilar conditions of the laminar flowing material in a second circumferential direction which is the opposite of the first circumferential direction.

24. The tool which produces significantly balanced conditions of concentric laminates of a stream of laminar flowing material according to claim 16 wherein said repositioners in at least one pair of branch runners reposition the dissimilar conditions of the laminar flowing material in one runner of the pair in a circumferential direction which is the opposite from the circumferential direction in which the repositioners reposition the dissimilar conditions of the laminar flowing material in the other runner of the pair, so that the flow from each runner of at least one pair of branch runners causes the conditions across the flow path of the joint stream of material to be symmetrical from side-to-side of two perpendicular planes which bisect the cross section of at least a portion of the flow path of the material immediately downstream of said junction of the pair of branch runners.

25. The tool which produces significantly balanced conditions of concentric laminates of a stream of laminar flowing material according to claim 16 wherein said repositioners of at least one pair of branch runners reposition the dissimilar conditions of the laminar flowing material in the same circumferential direction in both runners of this pair of branch runners.

26. The tool which produces significantly balanced conditions of concentric laminates of a stream of laminar flowing material according to claim 16 wherein said tool includes one pair of branch runners, the joint stream of flowing material formed at said junction of said pair of branch runners forming a single joint stream of flowing material which is significantly balanced, but not necessarily symmetrical, from side-to-side of two perpendicular planes which bisect the cross section of at least a portion of the flow path of the flowing material immediately downstream of where the joint stream of flowing material is formed.

27. The tool which produces significantly balanced conditions of concentric laminates of a stream of laminar flowing material according to claim 16 wherein said branching runner branches in two directions forming two pairs of branch runners, each said pair of branch runners forming a separate joint stream of flowing material which is significantly balanced, but not necessarily symmetrical, from side-to-side of two perpendicular planes which bisect the cross section of at least a portion of the flow path of the material immediately downstream of said junction where each joint stream of flowing material is formed.

28. The tool which produces significantly balanced conditions of concentric laminates of a stream of laminar flowing material according to claim 16 wherein said tool comprises two separate branching runners, each said branching runner forming a pair of branch runners, each said pair of branch runners forming a separate joint stream of flowing material which is significantly balanced, but not necessarily symmetrical, from side-to-side of two perpendicular planes which bisect the cross section of at least a portion of the flow path of the material immediately downstream of said junction where each joint stream of flowing material is formed.

29. The tool which produces significantly balanced conditions of concentric laminates of a stream of laminar flowing material according to claim 16 wherein said branching runner branches in four directions forming at least two pairs of branch runners, each said pair of branch runners forming a separate joint stream of material which is significantly balanced, but not necessarily symmetrical, form side-to-side of two perpendicular planes which bisect the cross section of at least a portion of the flow path of the material immediately downstream of said junction where the joint stream of material is formed.

30. The tool which produces significantly balanced conditions of concentric laminates of a stream of laminar flowing material according to claim 16 wherein said branching runner branches in four directions forming four pairs of branch runners, each pair of branch runners forming a separate joint stream of flowing material which is significantly balanced, but not necessarily symmetrical, from side-to-side of two perpendicular planes which bisect the cross section of at least a portion of the flow path of the flowing material immediately downstream of said junction where the joint stream of flowing material is formed.

31. The tool which produces significantly balanced conditions of concentric laminates of a stream of laminar flowing material according to claim 16 wherein said tool comprises two separate branching runners, each said branching runner branching into two directions and forming two pairs of first and second branch runners, each said pair of first and second branch runners forming a separate joint stream of flowing material which is significantly balanced, but not necessarily symmetrical, from side-to-side of two perpendicular planes which bisect the cross section of at least a portion of the flow path of the material immediately downstream of said junction where each joint stream of flowing material is formed.

32. An insert for use with a tool to produce significantly balanced conditions of concentric laminates of a stream of laminar flowing material for the formation of a product, said insert comprising at least one insert member which includes at least a portion of:

a runner system which receives laminar flowing material in said insert, said runner system including at least one branching runner which branches in at least two directions to form at least one pair of branch runners, said branch runners each providing part of a flow path for the laminar flowing material having significantly similar conditions from side-to-side of a first bisecting plane in each branch runner, the first bisecting plane of each branch runner bisecting the cross section of at least a portion of the length of that branch runner, the laminar flowing material having dissimilar conditions from side-to-side of a second plane which is perpendicular to the first bisecting plane of that branch runner and which also bisects the cross section of the same portion of the length of that branch runner as does the first bisecting plane of that branch runner;

a repositioner in each runner of each pair of branch runners which repositions the laminar flowing material in circumferential directions to preselected positions around the centers of the flow paths of each runner of each pair of branch runners while maintaining continuity between laminates of the flowing material from the center through the perimeter of each runner; and a junction of each pair of branch runners at a location on each branch runner of each pair which causes laminar flowing material from each branch runner to form a half of a joint stream of flowing material in a joint flow path, and, due to the preselected positions to which the dissimilar conditions of the laminar flowing material have been repositioned around the centers of the flow paths of each runner of each pair of branch runners, said joint flow path runner has conditions across it that are significantly balanced, but not necessarily symmetrical, from side-to-side of two perpendicular planes which bisect the cross section of at least a portion of said joint flow path immediately downstream of said junction.

33. The insert for use with a tool to produce significantly balanced conditions of concentric laminates of a stream of laminar flowing material of claim 32 wherein each said repositioner comprises a first change in direction of the flow path of the flowing material along a first plane which includes the centerline of the flow path of the flowing material immediately before said first change in direction and the centerline of the flow path of the flowing material immediately after said first change in direction, and followed by a second change in direction of the flow path located downstream of said first change in direction, which occurs in a direction which is not along said first plane so as to reposition the dissimilar conditions of the laminar flowing material in a circumferential direction.

34. The insert for use with a tool to produce significantly balanced conditions of concentric laminates of a stream of laminar flowing material of claim 32 wherein each said repositioner comprises a first change in direction of the flow path of the flowing material along a first plane which includes the centerline of the flowing material immediately before said first change in direction of the flow path and the centerline of the flow path of the flowing material immediately after said first change in direction of the flow path, followed by a second change in direction of the flow path of the flowing material, downstream of said first change in direction, which occurs in a direction which is not along said first plane, said first change in direction and said second change in direction of the flow path having preselected flow angles which cause a predetermined amount of repositioning of the dissimilar conditions of the laminar flowing material to occur in a circumferential direction.

35. The insert for use with a tool to produce significantly balanced conditions of concentric laminates of a stream of laminar flowing material according to claim 32 wherein each repositioner is at a location of said insert about where a pair of branch runners branches from said branching runner.

36. The insert for use with a tool to produce significantly balanced conditions of concentric laminates of a stream of lamninar flowing material according to claim 32 wherein each repositioner is located at about the junction of a pair of branch runners where the junction forms a joint stream of material.

37. The insert for use with a tool to produce significantly balanced conditions of concentric laminates of a stream of laminar flowing material according to claim 32 wherein each repositioner is at a location in a branch runner of a pair of branch runners which is between a location in said insert where said pair of branch runners branch from said at least one branching runner and a location in said insert where said branch runners join to form a joint stream of material.

38. The insert for use with a tool to produce significantly balanced conditions of concentric laminates of a stream of laminar flowing material according to claim 32 wherein said repositioner in each of at least one pair of branch runners includes components that are located in multiple locations of that runner.

39. The insert for use with a tool to produce significantly balanced conditions of concentric laminates of a stream of laminar flowing material according to claim 32 wherein the repositioner in a first runner of at least one pair of branch runners repositions the dissimilar conditions of the lamninar flowing material in a first circumferential direction, and the repositioner in the second runner of the at least one pair of branch runners repositions the dissimilar conditions of the laminar flowing material in a second circumferential direction which is the opposite of the first circumferential direction.

40. The insert for use with a tool to produce significantly balanced conditions of concentric laminates of a stream of laminar flowing material according to claim 32 wherein said repositioners in at least one pair of branch runners reposition the dissimilar conditions of the laminar flowing material in one runner of the pair in a circumferential direction which is the opposite of the circumferential direction in which the repositioners reposition the dissimilar conditions of the laminar flowing material in one runner of the pair in a circumferential direction which is the opposite from the circumferential direction in which the repositioners reposition the dissimilar conditions of the laminar flowing material in the other runner of the pair, so that the flow from each runner of at least one pair of branch runners causes the conditions across the flow path of the joint stream of material to be symmetrical from side to-side of two perpendicular planes which bisect the cross section of at least a portion of the flow path of the material immediately downstream of said junction of the pair of branch runners.

41. The insert for use with a tool to produce significantly balanced conditions of concentric laminates of a stream of laminar flowing material according to claim 32 wherein said repositioners of at least one pair of branch runners reposition the dissimilar conditions of the laminar flowing material in the same circumferential direction in both runners of this pair of branch runners.

42. The insert for use with a tool to produce significantly balanced conditions of concentric laminates of a stream of laminar flowing material according to claim 32 wherein said insert includes one pair of branch runners, the joint stream of flowing material formed at said junction of said pair of branch runners forming a single joint stream of flowing material which is significantly balanced, but not necessarily symmetrical, from side-to-side of two perpendicular planes which bisect the cross section of at least a portion of the flow path of the flowing material immediately downstream of where the joint stream of flowing material is formed.

43. The insert for use with a tool to produce significantly balanced conditions of concentric laminates of a stream of laminar flowing material according to claim 32 wherein said branching runner branches in two directions forming two pairs of branch runners, each said pair of branch runners forming a separate joint stream of flowing material which is significantly balanced, but not necessarily symmetrical, from side-to-side of two perpendicular planes which bisect the cross section of at least a portion of the flow path of the material immediately downstream of said junction where each joint stream of flowing material is formed.

44. The insert or use with a tool to produce significantly balanced conditions of concentric laminates of a stream of laminar flowing material according to claim 32 wherein said insert comprises two separate branching runners, each said branching runner forming a pair of branch runners, each said pair of branch runners forming a separate joint stream of flowing material which is significantly balanced, but not necessarily symmetrical, from side-to-side of two perpendicular planes which bisect the cross section of at least a portion of the flow path of the material immediately downstream of said junction where each joint stream of flowing material is formed.

45. The insert for use with a tool to produce significantly balanced conditions of concentric laminates of a stream of laminar flowing material according to claim 32 wherein said branching runner branches in four directions forming at least two pairs of branch runners, each said pair of branch runners forming a separate joint stream of material which is significantly balanced, but not necessarily symmetrical, from side-to-side of two perpendicular planes which bisect the cross section of at least a portion of the flow path of the material immediately downstream of said junction where the joint stream of material is formed.

46. The insert for use with a tool to produce significantly balanced conditions of concentric laminates of a stream of laminar flowing material according to claim 32 wherein said branching runner branches in four directions forming four pairs of branch runners, each pair of branch runners forming a separate joint stream of flowing material which is significantly balanced, but not necessarily symmetrical, from side-to-side of two perpendicular planes which bisect the cross section of at least a portion of the flow path of the flowing material immediately downstream of said junction where the joint stream of flowing material is formed.

47. The insert for use with a tool to produce significantly balanced conditions of concentric laminates of a stream of laminar flowing material according to claim 32 wherein said insert comprises two separate branching runners, each said branching runner branching into two directions and forming two pairs of first and second branch runners, each said pair of first and second branch runners forming a separate joint stream of flowing material which is significantly balanced, but not necessarily symmetrical, from side-to-side of two perpendicular planes which bisect the cross section of at least a portion of the flow path of the material immediately downstream of said junction where each joint stream of flowing material is formed.

48. The insert for use with a tool to produce significantly balanced conditions of concentric laminates of a stream of laminar flowing material according to claim 32 wherein said insert comprises said repositioner in each runner of each pair of branch runners.

* * * * *